(12) United States Patent
Schneider et al.

(10) Patent No.: US 8,151,563 B2
(45) Date of Patent: Apr. 10, 2012

(54) HYDRAULIC DRIVE SYSTEM

(75) Inventors: Klaus Schneider, Hergatz (DE);
Wilhelm Krautler, Koblach (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 647 days.

(21) Appl. No.: 12/284,808

(22) Filed: Sep. 25, 2008

(65) Prior Publication Data

US 2009/0100830 A1    Apr. 23, 2009

(30) Foreign Application Priority Data

Sep. 28, 2007   (DE) .......................... 10 2007 046 696

(51) Int. Cl.
*F15B 1/02* (2006.01)
*B66D 1/08* (2006.01)
(52) U.S. Cl. ............................................ 60/414; 60/445
(58) Field of Classification Search .................... 60/414, 60/445, 484
See application file for complete search history.

(56) References Cited

U.S. PATENT DOCUMENTS

| | | | |
|---|---|---|---|
| 3,903,696 A * | 9/1975 | Carman | 60/414 |
| 3,990,235 A | 11/1976 | Bauchet | |
| 4,098,083 A * | 7/1978 | Carman | 60/414 |
| 4,215,545 A | 8/1980 | Morello et al. | |
| 5,579,868 A | 12/1996 | Pelto-Huikko | |
| 6,336,518 B1 * | 1/2002 | Matsuyama | 180/306 |
| 2008/0081724 A1 | 4/2008 | Ivantysynova | |

FOREIGN PATENT DOCUMENTS

| | | |
|---|---|---|
| DE | 2817405 | 10/1978 |
| DE | 3003257 | 8/1980 |
| DE | 4000185 | 7/1990 |
| DE | 69421242 | 3/2000 |
| DE | 3247335 | 7/2007 |
| DE | 102005061990 | 7/2007 |

OTHER PUBLICATIONS

Hydraulik in Theorie and Praxis, Von Bosch. Robert Bosch GmbH Stuttgart 1983, pp. 218-219.

* cited by examiner

*Primary Examiner* — Thomas E Lazo
(74) *Attorney, Agent, or Firm* — Dilworth & Barrese, LLP.

(57) ABSTRACT

The present invention relates to a hydraulic drive system for driving an apparatus, with a drive unit, a first and a second hydraulic displacement machine, with which the drive unit is connectable or connected for transmitting mechanical energy, and a third and a fourth hydraulic displacement machine, which are connectable or connected with the apparatus for transmitting mechanical energy, wherein the first hydraulic displacement machine is hydraulically connected or connectable with the third hydraulic displacement machine, and wherein a high-pressure accumulator is provided, which is hydraulically connected or connectable with the second and the fourth hydraulic displacement machine.

32 Claims, 15 Drawing Sheets

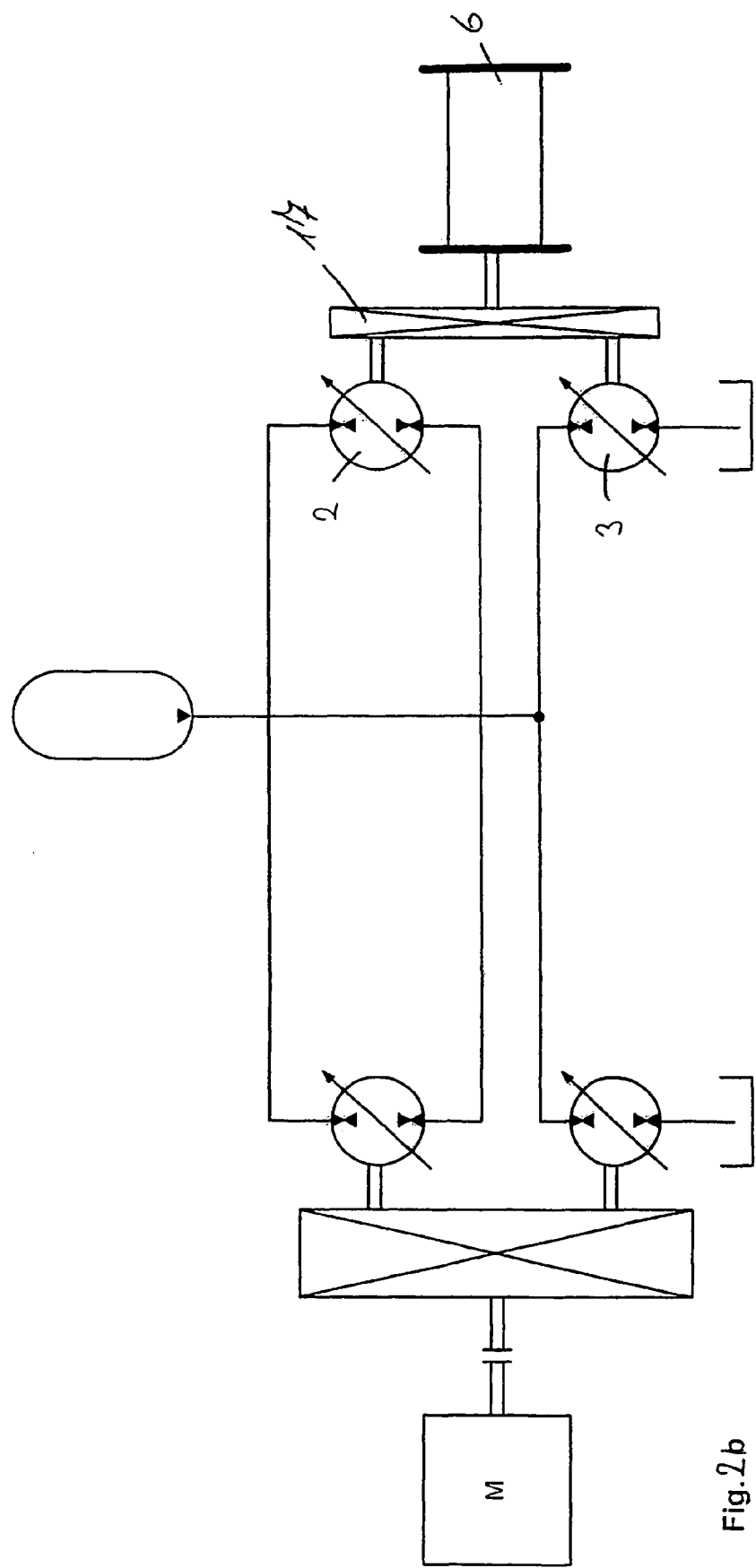
Fig.2.b

HYDRAULIC DRIVE SYSTEM

BACKGROUND OF THE INVENTION

The present invention relates to a hydraulic drive system for driving an apparatus, with a drive unit which can drive the apparatus via a primary hydraulic circuit comprising a first and a second hydraulic displacement machine, and with a third hydraulic displacement machine, which is connectable or connected with the apparatus for transmitting mechanical energy, and a high-pressure accumulator which is hydraulically connected or connectable with the third displacement machine. In particular, the present invention relates to a hydraulic drive system which is used in a crane, in particular for driving a winch. Furthermore, the present invention relates to a hydraulic drive system which is used in a mobile equipment, in particular a reachstacker or a wheel loader, in particular as a traveling drive.

Such hydraulic drive systems usually include a primary drive unit, e.g. an internal combustion engine or an electric motor which drives one or more hydraulic pumps, in order to provide hydraulic energy for driving the apparatus. To increase the performance of such systems, it is first of all possible to dimension the drive unit larger, so as to be able to also provide more hydraulic energy. With increasing size of the primary drive unit, however, the costs, the packaging space and the energy consumption of the system are also increasing.

For this reason, hydraulic energy accumulators are used to an increasing extent, which are charged e.g. in braking phases, and in acceleration phases supply the hydraulic energy stored in the same to the drive system. Thus, the drive unit itself can be dimensioned smaller, as it is supported by the high-pressure accumulator during load peaks. In known hydraulic drive systems with such high-pressure accumulator, no satisfactory efficiencies can be achieved for the storage and release of energy. In addition, activation often is complicated.

SUMMARY OF THE INVENTION

Therefore, it is the object of the present invention to provide a hydraulic drive system which provides for an efficient storage of energy and a simple activation.

In accordance with the invention, this object is solved by a hydraulic drive system for driving an apparatus as described herein. Such hydraulic drive system comprises a drive unit which can drive the apparatus via a primary hydraulic circuit comprising a first and a second hydraulic displacement machine, and a third hydraulic displacement machine, which is connectable or connected with the apparatus for transmitting mechanical energy, and a high-pressure accumulator which is hydraulically connected or connectable with the third displacement machine. In accordance with the invention, the high-pressure accumulator can be charged by a hydraulic displacement machine which is connected or connectable with the drive unit for transmitting mechanical energy.

Since the high-pressure accumulator can be charged via a hydraulic displacement machine, which is connected or connectable with the drive unit, the high-pressure accumulator can be charged with an excellent efficiency in phases in which the driving power provided by the drive unit is not or not completely required for driving the apparatus, as a direct conversion of the mechanical energy supplied by the drive unit into hydraulic energy is effected by the hydraulic displacement machine.

With the arrangement of the invention it is also possible to charge the high-pressure accumulator via the drive unit without moving the apparatus, whereas in known systems the high-pressure accumulator merely can be charged when the apparatus is moved. This results in a considerably improved flexibility in the accumulator management of the hydraulic drive system of the invention, as in phases in which the apparatus is out of operation and hence neither the second nor the third hydraulic displacement machine are moved, the high-pressure accumulator can also be charged via a hydraulic displacement machine which is connected or connectable with the drive unit for transmitting mechanical energy. Beside the optimum efficiency due to the direct conversion of the mechanical energy of the drive unit into hydraulic energy, which then is stored, an improved accumulator management also is obtained therewith.

With the arrangement of the invention it is in particular possible to always operate the drive unit, e.g. a Diesel engine, at an optimum operating point and store the energy not required in the primary hydraulic circuit in the high-pressure accumulator. During load peaks, this energy then can be returned to the drive system, so that the entire system has a high output power with a drive unit dimensioned relatively small. Moreover, the energy consumption of the drive unit thus can be optimized, just as the service life, as an optimum operating point can be employed.

In accordance with the invention, the first hydraulic displacement machine furthermore can operate as a hydraulic pump and the second hydraulic displacement machine can operate as a hydraulic motor, so that the first hydraulic displacement machine drives the second hydraulic displacement machine and forms a primary hydraulic circuit. Via the third hydraulic displacement machine a recovery of energy can be effected, which is independent of the primary hydraulic circuit. This provides for a particularly easy activation of the system of the invention. Advantageously, the volume flow flowing through the primary hydraulic circuit comprising the first hydraulic displacement machine and the second hydraulic displacement machine, and possibly the adjustment of these displacement machines, specifies the speed and position of the apparatus. Depending on the load situation, the third hydraulic displacement machine then can be used either for storing hydraulic energy or for supporting the drive system comprising first and second hydraulic displacement machines.

As a result, it is possible to primarily control the primary drive, whereas the secondary drive comprising high-pressure accumulator and third hydraulic displacement machine is controlled secondarily. In this way, the problems which have prevented a practical conversion of the energetically actually more advantageous secondary control can effectively be avoided. Previous drives under secondary control were difficult to master in terms of control technology, since torque differences immediately led to a movement of the apparatus. As in practice a 100% ideal torque cannot be generated due to tolerances in the hydraulic components, hysteresis and similar disturbing influences, the inventive combination of a drive circuit under primary control and secondary control thus provides enormous advantages in terms of control technology. In contrast to a simple drive under secondary control, the variant of the invention is very robust, since the primary drive specifies the desired speed or position and thus prevents undesired movements of the apparatus, even if the secondary drive comprising high-pressure accumulator and third hydraulic displacement machine does not exactly cause the pre-calculated desired torque. In particular in terms of safety, the system of the invention thus provides for a considerable improvement and combines the same with the energetic advantages of a drive under secondary control.

Advantageously, the high-pressure accumulator can be charged by the first hydraulic displacement machine, which anyway is present in the hydraulic drive system of the invention and is connectable or connected with the drive unit, in order to provide the hydraulic energy for driving the second hydraulic displacement machine. In phases in which the hydraulic energy provided by the first hydraulic displacement machine is not or not completely utilized by the second hydraulic displacement machine, this hydraulic energy can be stored in the high-pressure accumulator in accordance with the invention and then is available for supporting the drive unit in phases of operation with high load.

Advantageously, the high-pressure accumulator is connectable with the first hydraulic displacement machine via a valve. In phases in which the high-pressure accumulator should be charged via the drive unit and the first hydraulic displacement machine, the high-pressure accumulator is connected with the primary hydraulic circuit via this valve. In phases, however, in which the hydraulic energy stored in the high-pressure accumulator is utilized for driving the apparatus, the high-pressure accumulator is separated from the primary hydraulic circuit and drives the apparatus via the third hydraulic displacement machine. Thus, the valve by which the high-pressure accumulator is connectable with the first hydraulic displacement machine advantageously has a switching position in which the high-pressure accumulator is separated from the first hydraulic displacement machine and a second switching position in which the high-pressure accumulator is connected with the first hydraulic displacement machine.

In a furthermore advantageous way, the connection can be throttled. Via such a flow control valve, the accumulator management in accordance with the invention can be activated efficiently.

Alternatively, a fourth hydraulic displacement machine can be provided in accordance with the invention, by means of which the high-pressure accumulator can be charged. In addition to the above-mentioned advantages of the efficient and flexible accumulator management, this provides a flexible configuration of the remaining hydraulic system, since the primary hydraulic circuit comprising first and second hydraulic displacement machines can be operated independent of the second hydraulic circuit comprising fourth hydraulic displacement machine, high-pressure accumulator and third hydraulic displacement machine.

Such embodiment of the invention hence comprises a drive unit, a first and a fourth hydraulic displacement machine, with which the drive unit is connectable or connected for transmitting mechanical energy, and a second and a third hydraulic displacement machine, which are connectable or connected with the apparatus for transmitting mechanical energy. The first hydraulic displacement machine is hydraulically connected or connectable with the second hydraulic displacement machine. Furthermore, a high-pressure accumulator is provided in accordance with the invention, which is hydraulically connected or connectable with the fourth and the third hydraulic displacement machine.

This initially provides a primary hydraulic circuit comprising a first and a second hydraulic displacement machine, via which the apparatus can be driven hydraulically. The fourth and the third hydraulic displacement machine, however, serve the efficient accumulator management of the high-pressure accumulator. Due to the fact that the fourth hydraulic displacement machine is connected or connectable with the primary drive unit and at the same time the third hydraulic displacement machine is connectable or connected with the apparatus, optimum efficiencies and a good utilization of the driving power provided by the primary drive unit are obtained both when charging the high-pressure accumulator and when recovering energy. In addition, an optimum controllability of the system is obtained by using the four displacement machines.

Furthermore advantageously, the high-pressure accumulator can be charged via the third hydraulic displacement machine in accordance with the invention, in that the same operates as a hydraulic pump. In phases in which the apparatus should be braked, it thus is possible to store the mechanical energy transmitted from the apparatus to the drive system. Here as well, an excellent efficiency is ensured, since the mechanical energy from the apparatus is directly converted into hydraulic energy via the third hydraulic displacement machine and supplied to the high-pressure accumulator. The energy consumption of the system also can be reduced in this way. In addition, a smaller drive unit can be employed, since the hydraulic energy stored in the high-pressure accumulator can be used to support the system during acceleration phases.

Particularly advantageously, the high-pressure accumulator can be charged either via the first or the fourth hydraulic displacement machine or via the third hydraulic displacement machine, depending on the operating condition, so that excellent efficiencies each are obtained, regardless of whether the high-pressure accumulator is charged via the drive unit or via the apparatus.

Furthermore advantageously, the hydraulic displacement machine used for charging is connected or connectable with a hydraulic reservoir. When storing energy, hydraulic fluid thus can be pumped out of the hydraulic reservoir and pumped into the high-pressure accumulator. However, if the respective hydraulic displacement machine operates as a hydraulic motor, the fluid can flow off into the hydraulic reservoir via the hydraulic displacement machine.

In accordance with the invention, the third and/or the fourth hydraulic displacement machine advantageously is connected with a hydraulic reservoir. When a fourth hydraulic displacement machine is used, an open secondary hydraulic circuit comprising fourth hydraulic displacement machine, high-pressure accumulator and third hydraulic displacement machine advantageously is obtained.

However, when the high-pressure accumulator can be charged via the first hydraulic displacement machine, the configuration depends on whether the primary hydraulic circuit is of the open or closed type. In the case of an open primary hydraulic circuit, the first hydraulic displacement machine is connected with the hydraulic reservoir and can charge the high-pressure accumulator, when the same is connected with the outlet of the first hydraulic displacement machine operating as a hydraulic pump. In the case of a closed primary hydraulic circuit, however, the hydraulic fluid advantageously is provided via the anyway present leak-oil compensation, for which purpose the hydraulic reservoir is connected via a feed pump and a check valve with the inlet of the first hydraulic displacement machine operating as a hydraulic pump, which hereby is supplied with hydraulic fluid of minimum pressure.

Furthermore advantageously, the third hydraulic displacement machine operates as a hydraulic motor in accordance with the invention and is driven via the high-pressure accumulator. In phases of high load, it thus is possible to return the hydraulic energy stored in the high-pressure accumulator to the drive system and drive the apparatus. There is again obtained an excellent efficiency, since the hydraulic energy directly is converted into mechanical energy via the third hydraulic displacement machine, which mechanical energy then drives the apparatus. Since the primary drive is supported by the third hydraulic displacement machine, the drive unit can be dimensioned smaller, as load peaks can be absorbed by the energy stored in the high-pressure accumulator.

Furthermore advantageously, the first and/or fourth hydraulic displacement machine can operate as a hydraulic motor and be driven via the high-pressure accumulator. In this way, it is possible to also provide energy to further loads driven in parallel by the drive unit, with a good efficiency being obtained here as well.

Furthermore advantageously, the first hydraulic displacement machine also can operate as a hydraulic motor, and the second hydraulic displacement machine also can operate as a hydraulic pump, so that the second displacement machine drives the first hydraulic displacement machine. In this way, it is possible that e.g. in braking phases of the apparatus energy is recirculated to further loads, which are driven in parallel by the drive unit, via the circuit comprising second and first hydraulic displacement machines.

In accordance with the invention, the first and second hydraulic displacement machines advantageously form a closed hydraulic circuit. Such closed hydraulic circuit of first and second hydraulic displacement machines for driving the apparatus is of great advantage for many applications, but in previously known hydraulic drive systems it prevents an efficient recovery of energy and an efficient accumulator management.

However, due to the use of a third hydraulic displacement machine, which is connected with the high-pressure accumulator, and the chargeability of the high-pressure accumulator by a hydraulic displacement machine, which is connectable with the drive unit, it now is possible to perform an efficient accumulator management and a storage and recovery of energy with high efficiencies also in the case of a closed hydraulic circuit comprising first and second hydraulic displacement machines.

Of course, the present invention can, however, also advantageously be used when the first and the second hydraulic displacement machine form an open hydraulic circuit.

Furthermore advantageously, the shafts of the second and the third hydraulic displacement machine are connectable or connected with a drive shaft of the apparatus for transmitting mechanical energy. In this way, mechanical energy can efficiently be transmitted from the second and the third hydraulic displacement machine to the drive shaft of the apparatus, and vice versa.

Furthermore advantageously, the shafts of the second and the third hydraulic displacement machine are connected directly or via a transmission. As a result, the movement of the shafts of the second and the third hydraulic displacement machine is firmly coupled, so that a simple construction is obtained with a high efficiency.

Furthermore advantageously, the shafts of the second and/or the third hydraulic displacement machine are connectable with the drive shaft of the apparatus via at least one clutch. As a result, the inventive connection for transmitting mechanical energy can be made efficiently, if necessary.

Furthermore advantageously, the output shaft of the drive unit is connectable or connected with drive shafts of the first and/or the fourth hydraulic displacement machine for transmitting mechanical energy. In this way, the first and/or the fourth hydraulic displacement machine can be driven by the drive unit and thus convert the mechanical energy provided by the drive unit into hydraulic energy.

Furthermore advantageously, the drive shafts of the first and the fourth hydraulic displacement machine are independently connectable with the output shaft of the drive unit via at least two clutches. In this way, a corresponding activation of the first and the fourth hydraulic displacement machine is possible independently, so that e.g. only the first hydraulic displacement machine is driven or only the fourth hydraulic displacement machine, or both of them.

Furthermore advantageously, the drive unit drives the drive shafts of the first and/or the fourth hydraulic displacement machine via a transmission. This transmission then provides the corresponding gear ratio for driving the first and/or the fourth hydraulic displacement machine. The drive unit can be connectable with the transmission via a clutch. Furthermore, the transmission can be connectable with the first and/or the fourth hydraulic displacement machine via clutches.

Furthermore advantageously, a further apparatus is provided in accordance with the invention, which is driven via the drive unit. Advantageously, the further apparatus is driven in parallel to the first and/or the fourth hydraulic displacement machine. When the first apparatus is e.g. the hoisting gear of a crane, the fourth apparatus can be e.g. the luffing gear or the stewing gear of the crane, so that a plurality of positioners of the crane can be driven via a single drive unit.

Furthermore advantageously, the further apparatus is driven via a hydraulic circuit with a hydraulic pump, wherein the hydraulic pump is driven by the drive unit. The drive unit hence is used to drive a plurality of hydraulic circuits for driving a plurality of apparatuses.

Furthermore advantageously, the further apparatus or the hydraulic pump driving the further apparatus is connectable with the drive unit via at least one clutch independent of the first and/or the fourth hydraulic displacement machine. Thus, the individual apparatuses can independently be driven via the drive unit.

Furthermore advantageously, the further apparatus or the hydraulic pump driving the further apparatus is connectable with the first and/or fourth hydraulic displacement machine for transmitting mechanical energy, in particular via at least one clutch. In this way, it is possible to transmit energy from the first and/or the fourth hydraulic displacement machine to the further apparatus or to the hydraulic pump driving the further apparatus, so that the further apparatus also can be included in the accumulator management or the recovery of energy. However, less good efficiencies are obtained for the further apparatus, since hydraulic energy here must first be converted into mechanical energy and then back into hydraulic energy. The connection of the first and/or fourth hydraulic displacement machine with the further apparatus or the hydraulic pump driving the further apparatus can be effected e.g. via a common transmission, via which all components are driven by the drive unit. This transmission then can also be used for energy transmission between the individual components.

Furthermore advantageously, the drive unit of the hydraulic drive system of the invention comprises an internal combustion engine or an electric motor. The drive unit thus represents a primary drive unit, which drives the individual hydraulic displacement machines. Due to the hydraulic drive system of the invention, the drive unit can be operated at an optimum operating point, since in phases of low load energy can be stored via the high-pressure accumulator, and in phases of high load this energy can be fed into the system, in order to relieve the motor of the drive unit. In the case of a high output power, it is also possible in this way to use a drive unit with relatively little driving power.

Advantageously, the drive unit of the invention comprises a single motor. Instead of using two motors, in order to increase the total performance of the system, as is necessary without the high-pressure accumulator management of the invention, a single motor is sufficient in the present invention, since load peaks can be absorbed via the high-pressure accumulator. Alternatively, a plurality of motors can be used, which drive a transmission in parallel, since the connection of the drive unit with the first and/or fourth hydraulic displacement machine ensures an optimum utilization of the individual motors, in which drive energy not required is stored.

Furthermore advantageously, the first and/or the second hydraulic displacement machine have an adjustable displacement volume in accordance with the invention. In this way, the hydraulic circuit comprising first and second hydraulic displacement machines then can be activated correspondingly.

Furthermore advantageously, the third and/or the fourth hydraulic displacement machine of the hydraulic drive system of the invention includes an adjustable displacement volume. Via the adjustability of the fourth hydraulic displacement machine, the storage and release of energy thus can be controlled via this displacement machine, and via the adjustability of the third hydraulic displacement machine the recovery of energy from the apparatus and the corresponding additional drive of this apparatus.

Furthermore advantageously, the first and/or the second hydraulic displacement machine has two directions of delivery. In this way, it is possible to move the apparatus in two directions via the first and the second hydraulic displacement machine.

Furthermore advantageously, the third and/or the fourth hydraulic displacement machine has two directions of delivery in accordance with the invention. In this way, it is possible to operate the third and/or the fourth hydraulic displacement machine without an otherwise necessary circuit arrangement both as pump and as motor, by switching over from one direction of delivery to the other direction of delivery.

Furthermore advantageously, two apparatuses are provided in accordance with the invention, whose drive systems each include first, second and third hydraulic displacement machines, wherein the first hydraulic displacement machines are connectable or connected with the drive unit for transmitting mechanical energy, and the second and third hydraulic displacement machines each are connectable or connected with the apparatuses for transmitting mechanical energy and the first hydraulic displacement machines each are hydraulically connected or connectable with the second hydraulic displacement machines. In essence, two parallel hydraulic drive systems comprising first, second and third hydraulic displacement machines thus are obtained. The high-pressure accumulator of the invention is hydraulically connected or connectable with the third hydraulic displacement machines. In this way, it is possible to achieve an optimum storage of energy also with two loads, since the efficiency of the recovery of energy from both loads is optimized by the two third hydraulic displacement machines.

The storage of energy by the drive unit can be effected via one or both of the first hydraulic displacement machines. For this purpose, the high-pressure accumulator advantageously is connectable with the outlet of at least one of the first hydraulic displacement machines via one or more valves.

Alternatively, the storage of energy also can be effected via a fourth hydraulic displacement machine. For storing energy directly from the driving power of the drive unit, only one single fourth hydraulic displacement machine must be provided, in order to achieve an optimum efficiency.

Advantageously, the hydraulic drive system of the invention includes a control for activating the storage and work functions of the system. This control then performs the corresponding activation of the system components, in order to either store energy in the high-pressure accumulator or return this energy to the system in the individual phases.

Advantageously, the hydraulic drive system of the present invention is the drive system of a crane. Here, the accumulator management of the invention can be used with great benefit.

Advantageously, the apparatus is a winch, in particular a hoisting winch. In particular, the energy released when lowering loads can be recovered via the third hydraulic displacement machine, and when lifting the loads the drive unit can be supported via the high-pressure accumulator. It is also possible to charge the high-pressure accumulator via the first or fourth hydraulic displacement machine, when the drive unit otherwise is loaded only little. This results both in a considerable increase in performance and in substantial savings of energy. The primary driving power thus can be reduced despite an increased output power. The cooler surfaces likewise can be reduced, since the energy released when lowering the load no longer must be destroyed, but can be stored. In addition, the decreased speed of the primary drive results in a reduction of noise and exhaust emissions. Furthermore, an increased service life is obtained for the drive unit, e.g. a Diesel engine, due to the uniform load.

The hydraulic drive system of the invention can, however, also be used for driving a mobile equipment, in particular a reachstacker or wheel loader. Due to the accumulator management of the invention, considerable savings of energy and increases in performance are obtained here as well.

Advantageously, the apparatus is a traveling drive, so that energy can be recovered when braking, which energy then is available for acceleration.

The present invention furthermore comprises a crane with a hydraulic drive system of the invention, as it has been described above. This provides the same advantages, as they have already been described above.

The present invention furthermore comprises a mobile equipment, in particular a reachstacker or wheel loader, comprising a hydraulic drive system as described above. This also provides the advantages described above.

The present invention furthermore comprises a method for operating the drive system of the invention, wherein the high-pressure accumulator is charged by converting the kinetic energy of the apparatus via the third hydraulic displacement machine and/or the high-pressure accumulator is charged via a hydraulic displacement machine which is connected or connectable with the drive unit for transmitting mechanical energy, when the power of the drive unit is not or not completely required for driving the apparatus. In this way, the energy released e.g. when braking the apparatus can be stored on the one hand, and on the other hand the drive unit can be operated at an optimum operating point by storing excess power in the high-pressure accumulator via the hydraulic displacement machine. Due to the direct connection of the respective hydraulic displacement machine, excellent efficiencies each are obtained.

In accordance with the invention, charging the high-pressure accumulator can be effected by the drive unit, while the apparatus is not moved. This was not possible with conventional systems, but now allows a substantially improved energy management.

Advantageously, two hydraulic circuits comprising first and second hydraulic displacement machines on the one hand and fourth and third hydraulic displacement machines on the other hand are provided for this purpose, so that a division of labor is effected, by means of which a simple activation of the hydraulic system of the invention is possible.

Furthermore advantageously, the apparatus is driven by converting the hydraulic energy from the high-pressure accumulator via the third hydraulic displacement machine. In this way, it is possible to utilize the hydraulic energy stored there, in order to support the drive unit, which therefore requires less output power.

Furthermore advantageously, mechanical energy is released to further loads due to the conversion of the hydraulic energy from the high-pressure accumulator via the first and/or fourth hydraulic displacement machine. In the case of power peaks, it hence is possible to also drive further loads via the high-pressure accumulator, but here with a lower efficiency.

The present invention furthermore comprises a hydraulic drive system for driving an apparatus, with a drive unit which can drive the apparatus via a primary hydraulic drive comprising hydraulic pump and hydraulic motor, with a secondary hydraulic drive comprising a further hydraulic displacement machine, which is connected or connectable with the apparatus for transmitting mechanical energy, with a high-pressure accumulator which is hydraulically connected or connectable with the further displacement machine, and with a control, wherein the primary hydraulic drive is under primary control and the secondary hydraulic drive is under secondary control.

Furthermore, the present invention comprises a corresponding method for driving an apparatus via a hydraulic drive system with a drive unit, which can drive the apparatus via a primary hydraulic drive comprising hydraulic pump and hydraulic motor, and with a secondary hydraulic drive comprising a further hydraulic displacement machine, which is connectable or connected with the apparatus for transmitting mechanical energy, and with a high-pressure accumulator, which is hydraulically connected or connectable with the further displacement machine, wherein the primary hydraulic drive is under primary control and the secondary hydraulic drive is under secondary control.

The primary hydraulic drive under primary control thus specifies the velocity and position of the apparatus by the volume flow, so that minor inaccuracies in the secondary control of the further hydraulic displacement machine do not lead to an immediate, undesired movement of the load. Especially in terms of safety, this provides enormous advantages as compared to conventional drives under secondary control, which so far could not gain acceptance in particular because of these problems of the control technology hardly to be mastered. The inventive combination of a drive under secondary control with a drive under primary control provides for combining the advantages of a simple control with the advantages of an efficient recovery of energy.

The methods of the invention advantageously are performed automatically by the control of the hydraulic drive system in accordance with the invention.

BRIEF DESCRIPTION OF THE DRAWINGS

The present invention will now be described in detail with reference to embodiments and drawings, in which.

DESCRIPTION OF THE PREFERRED EMBODIMENTS

Figure 1A:
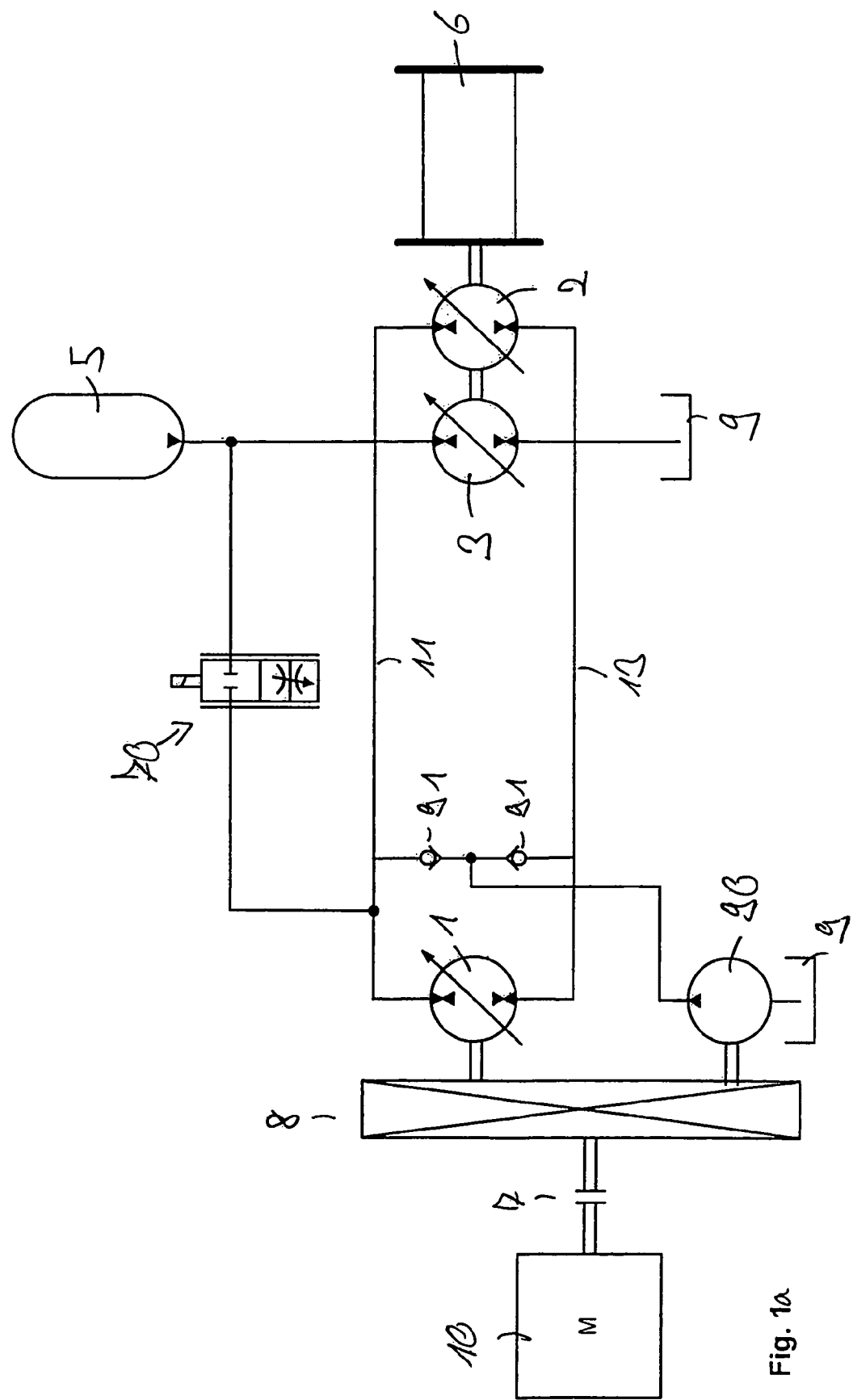
FIG. 1a: shows an embodiment of the hydraulic drive system of the invention for driving a winch with a closed primary hydraulic circuit, wherein the high-pressure accumulator can be charged via the first hydraulic displacement machine of the primary hydraulic circuit.

FIG. 1a now shows an embodiment of the hydraulic drive system of the invention for driving a winch 6. As drive unit 10, a Diesel engine is provided, which drives the first hydraulic displacement machine 1. For this purpose, the drive unit 10 is connected with the first hydraulic displacement machine 1 via a clutch 7 and a transmission 8. The first hydraulic displacement machine 1 is connected with a second hydraulic displacement machine 2 via hydraulic lines 11 and 13, so that a closed primary hydraulic circuit is obtained. The second hydraulic displacement machine 2 is connected with the winch 6 and drives the same.

Furthermore, a third hydraulic displacement machine 3 is provided, which likewise is connected with the winch 6. Via hydraulic lines, the same is connected with a hydraulic reservoir 9 and a high-pressure accumulator 5. Via a valve 70, the hydraulic accumulator 5 furthermore is connected with the first hydraulic displacement machine 1, namely via the pressure-side hydraulic line 11 of the primary hydraulic circuit.

When the first hydraulic displacement machine 1 now is driven by the drive unit 10, the primary hydraulic circuit drives the winch 6 via the second hydraulic displacement machine 2, so that a load can be lifted. On the other hand, when the load is lowered by the winch 6, the mechanical energy released can be converted into hydraulic energy in the third hydraulic displacement machine and be stored in the high-pressure accumulator 5. Due to the direct conversion of the mechanical energy into hydraulic energy, an excellent efficiency is obtained thereby. On the other hand, when lifting the load, the energy stored in the high-pressure accumulator 5 can be used to support the work of the second hydraulic displacement machine 2 via the third hydraulic displacement machine 3 and likewise drive the winch 6. Again, an excellent efficiency is obtained by the direct conversion of hydraulic energy into mechanical energy. The valve 70 is in the position shown in FIG. 1a, in which the high-pressure accumulator 5 is separated from the primary hydraulic circuit.

Furthermore, in operating phases in which the winch 6 is at rest or the drive energy required for actuating the winch 6 is lower than the energy provided by the drive unit 10, the high-pressure accumulator 5 can be connected with the outlet of the first hydraulic displacement unit 1 by switching over the valve 70, in order to charge the high-pressure accumulator 5. Again, an excellent efficiency is obtained, since the mechanical energy provided by the drive unit is directly converted into hydraulic energy by the first hydraulic displacement machine 1, which hydraulic energy is stored in the high-pressure accumulator 5. For activating the accumulator operation, the valve 70 can be throttled in its open position.

The hydraulic fluid, which during operation of the accumulator is pumped through the first hydraulic displacement machine 1 into the high-pressure accumulator 5, is provided by a smaller feed pump 90, which supplies the low-pressure side 13 with minimum pressure via a check valve 91 and thus compensates leak-oil losses also in known closed hydraulic circuits. In accordance with the invention, this feed pump 90 now supplies the first hydraulic displacement unit 1 with the hydraulic fluid, which the same pumps into the high-pressure accumulator 5.

Due to the fact that the high-pressure accumulator 5 can be charged directly via a hydraulic displacement machine, which is connected with the drive unit 10 for transmitting mechanical energy, it is possible in accordance with the invention to also store energy with an excellent efficiency when the winch 6 is at rest. As a result, the drive unit 10, e.g. in the form of a Diesel engine, always can be operated at an optimum operating point, wherein the mechanical energy provided by the drive unit 10 either is used for driving the winch 6 or is stored in the high-pressure accumulator 5. In addition, energy from the movement of the winch 6 can be recovered and stored via the third hydraulic displacement machine 3. In phases with high load, it is furthermore possible to utilize the stored hydraulic energy for driving the winch 6 via the third hydraulic displacement machine. As a result, the drive unit 10 can be dimensioned considerably smaller, since load peaks are compensated.

The first, second and third hydraulic displacement machines constitute variable-displacement pumps with two directions of delivery, with the hydraulic system being activated via the adjustment thereof. The volume flow through the closed hydraulic circuit of first and second hydraulic displacement machines determines the movement of the winch, whereas the third hydraulic displacement machine is driven by the winch 6 or drives the winch 6, depending on the load situation. The primary hydraulic circuit can be controlled primarily, whereas the third hydraulic drive unit is controlled secondarily, so that the respective advantages (safe and reliable activation under primary control and efficient recovery of energy under secondary control) can be combined, whereas the respective disadvantages are cancelled out.

Figure 1B:
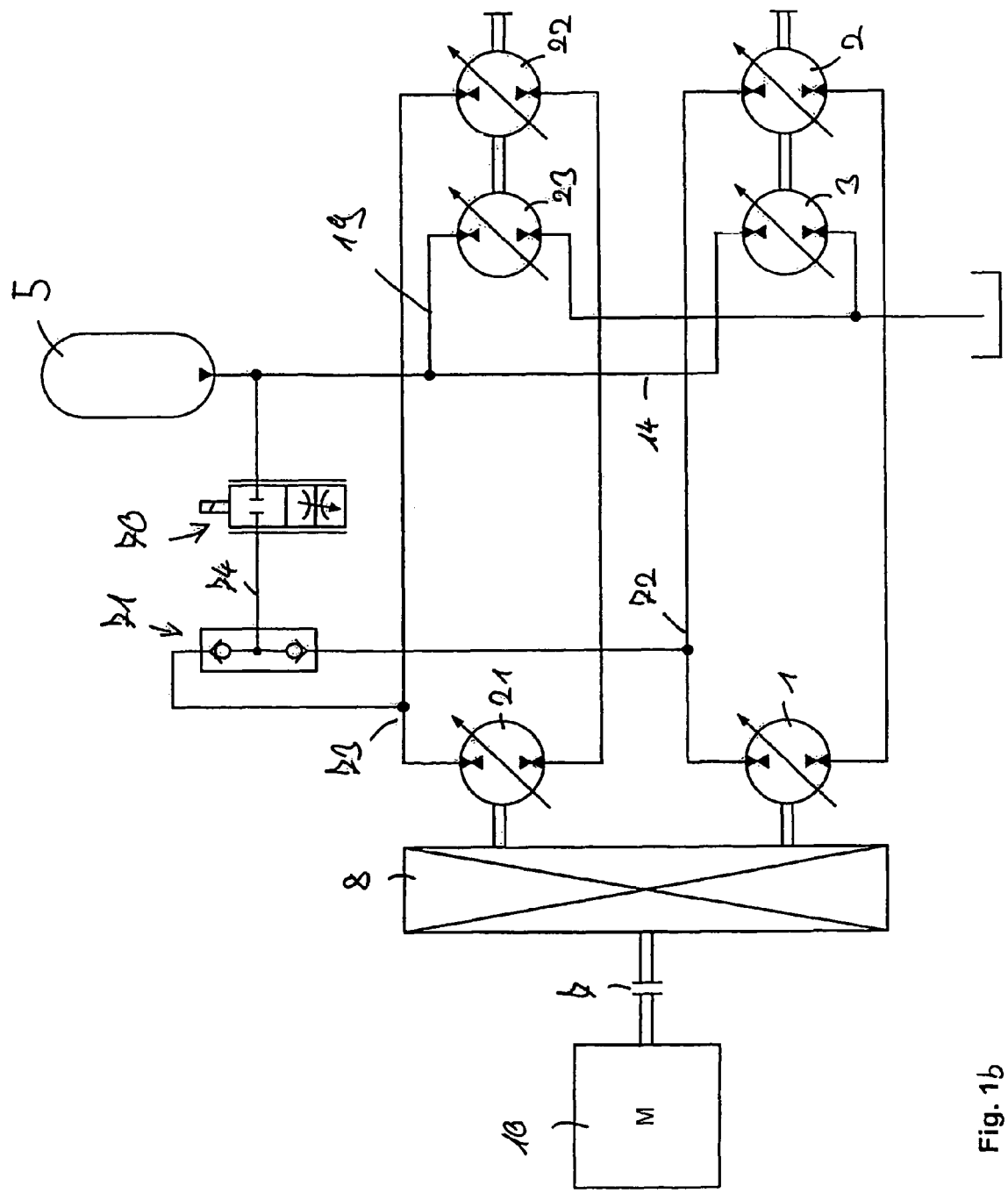
FIG. 1b: shows an embodiment of the hydraulic drive system of the invention for driving two apparatuses, wherein two closed primary hydraulic circuits are provided, and wherein the high-pressure accumulator can be charged via the primary hydraulic circuit with the higher pressure.

FIG. 1b now shows a further embodiment of the hydraulic drive system of the invention for driving two loads. Two closed primary hydraulic circuits are provided for driving the respective loads, which substantially correspond to the primary hydraulic circuits shown in FIG. 1a. The first hydraulic displacement machines 1 and 21 of the respective primary hydraulic circuits can be driven in parallel by the drive unit 10 via the transmission 8 and each are hydraulically connected with second hydraulic displacement machines 2 and 22, which drive the first and the second apparatus. With the two apparatuses, third hydraulic displacement machines 3 and 23 each are connected. With one port, the third hydraulic displacement machines 2 and 23 are connected with the hydraulic reservoir 9 and with the other port with the high-pressure accumulator 5. Via a valve 70, the high-pressure accumulator 5 furthermore is connected with a valve arrangement 71. The valve arrangement 71 comprises two check valves, via which the connecting line 74 between valve 70 and valve arrangement 71 is connected each with the pressure side 72, 73 of the primary hydraulic circuits. Thus, hydraulic storage in the embodiment shown in FIG. 1b substantially corresponds to the storage also shown in FIG. 1a, wherein in the open position of the valve 70 the high-pressure accumulator 5 each can be charged with the higher pressure via the primary hydraulic circuit.

By means of the embodiment shown in FIG. 1b, it is possible to perform the inventive operating modes of the storage of energy either via the first or third hydraulic displacement machines analogous to the embodiment shown in FIG. 1a. Likewise, the hydraulic energy stored in the high-pressure accumulator 5 can each be used for driving the two apparatuses via the third hydraulic displacement machines 3 and 23.

Figure 1C:
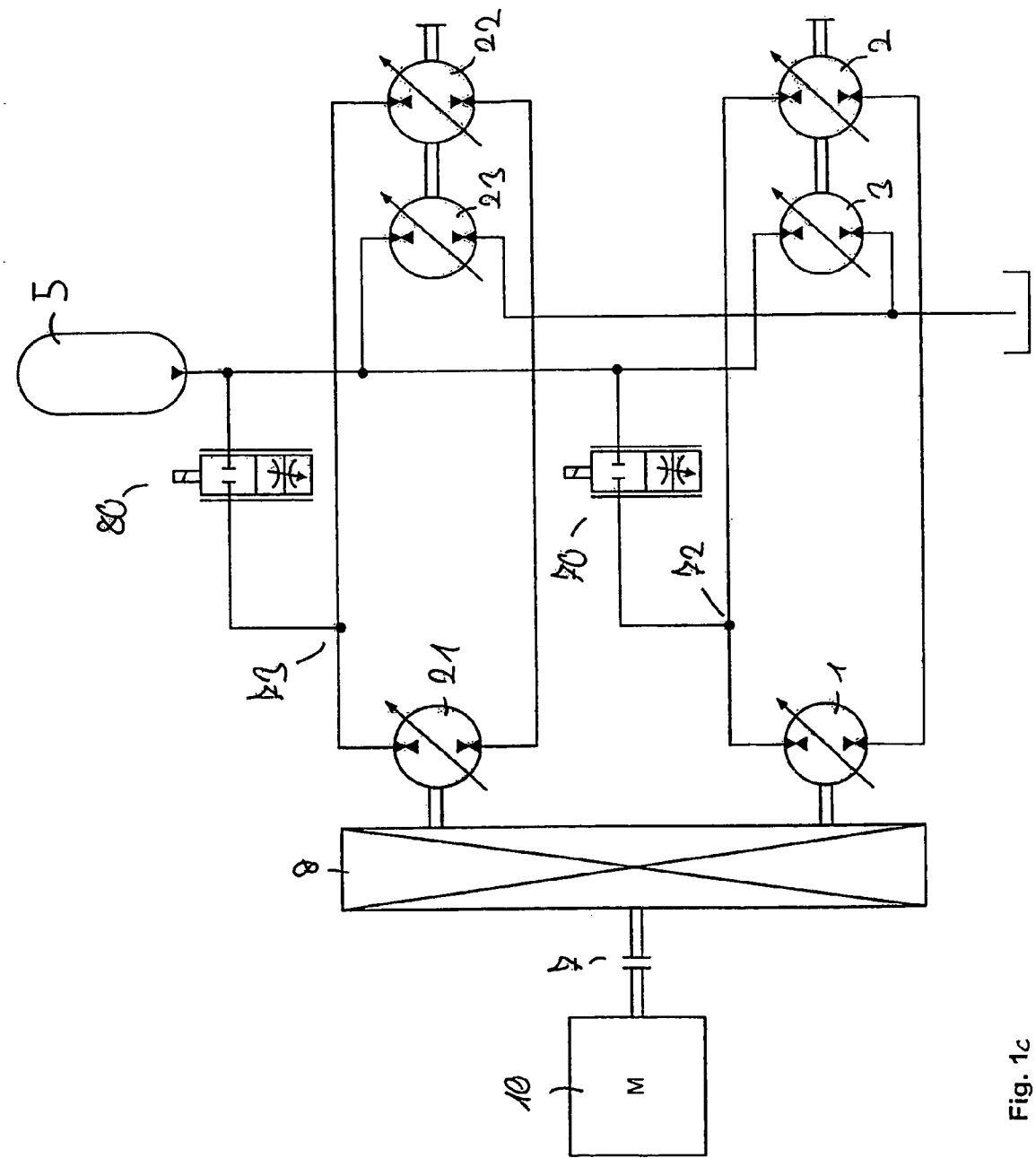
FIG. 1c: shows an embodiment of the hydraulic drive system of the invention for driving two loads, comprising two closed primary hydraulic circuits, wherein the high-pressure accumulator can be charged via the first hydraulic displacement machines of the respective primary hydraulic circuits.

FIG. 1c shows a further embodiment of the drive system of the invention, in which two apparatuses are driven as in FIG. 1b. The primary drive circuits identically correspond to the drive circuits shown in FIG. 1b, whereas instead of the valve arrangement 71 separate control valves 70 and 80 each are provided, via which the high-pressure accumulator 5 is connected with the pressure side 72, 73 of the primary hydraulic circuits. The valves. 70 and 80 operate analogous to the valve 70 shown in FIG. 1a, so that charging the high-pressure accumulator 5 is possible via the respective first hydraulic displacement machines 1 and 21 of the respective primary hydraulic circuits.

In the embodiments shown in FIGS. 1b and 1c, providing the hydraulic fluid, which is pumped into the high-pressure accumulator 5 via the first hydraulic displacement machines 1 and 21, is effected like in the embodiment shown in FIG. 1a via the respective leak-oil flow compensation, which in turn is effected via a non-illustrated feed pump.

Figure 2A:
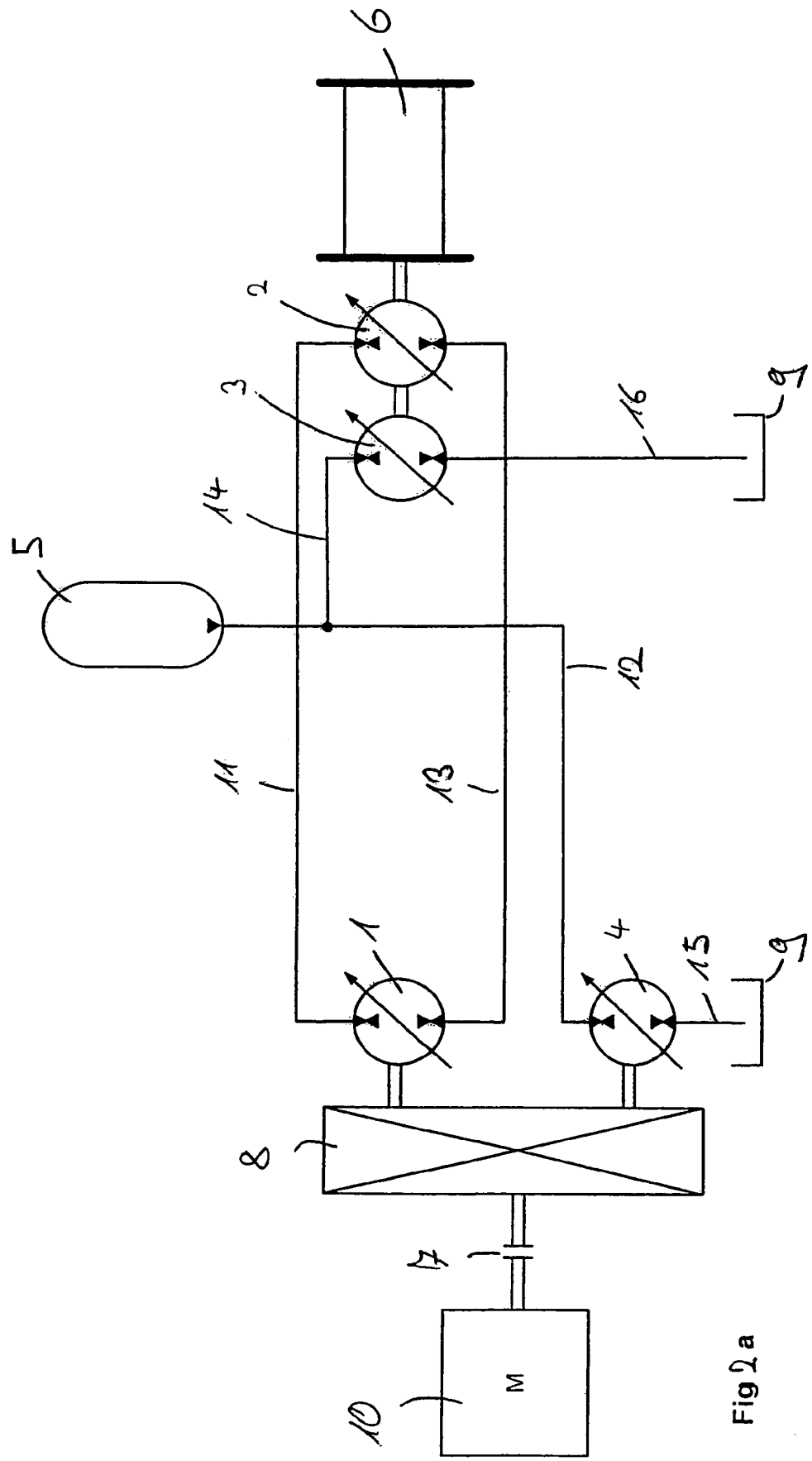
FIG. 2a: shows an embodiment of the hydraulic drive system of the invention for driving a winch, comprising a closed primary hydraulic circuit, wherein a fourth hydraulic displacement machine is provided, via which the high-pressure accumulator can be charged.

FIG. 2a shows a further embodiment of the hydraulic drive system of the invention for driving a winch 6 of a crane, in which charging the high-pressure accumulator is effected via the fourth hydraulic displacement unit 4. As drive unit 10, a Diesel engine likewise is provided, which is connected with a transmission 8 via a clutch 7. The transmission 8 in turn is connected with a first hydraulic displacement machine 1 and with the fourth hydraulic displacement machine 4. Via the clutch 7 and the transmission 8, the drive unit 10 hence can drive the first hydraulic displacement machine 1 and the fourth hydraulic displacement machine 4.

Via the hydraulic lines 11 and 13, the first hydraulic displacement machine 1 is connected with the second hydraulic displacement machine 2, so that a hydraulic circuit comprising first and second hydraulic displacement machines is obtained. The second hydraulic displacement machine 2 in turn is connected with the winch 6 and drives the same. In this embodiment, the hydraulic circuit comprising first and second hydraulic displacement machines is a closed hydraulic circuit, so that hydraulic fluid circulates in the circuit comprising first hydraulic displacement machine 1, hydraulic line 11, second hydraulic displacement machine 2 and hydraulic line 13, when the first hydraulic displacement machine is driven by the drive unit 10 and operates as pump.

Furthermore, a third hydraulic displacement machine 3 is provided, whose drive shaft is directly connected with the drive shaft of the second hydraulic displacement machine. The fourth hydraulic displacement machine 4 and the third hydraulic displacement machine 3 are connected with the high-pressure accumulator 5 via hydraulic lines 12 and 14. In the respective pumping operation of the fourth and third hydraulic displacement machines, hydraulic fluid can be pumped by the same from a hydraulic reservoir 9 into the high-pressure accumulator 5. In the working operation of the fourth and third hydraulic displacement machines, on the other hand, hydraulic fluid can flow from the high-pressure accumulator 5 via the respective displacement machines back to the hydraulic reservoir 9, so that the same operate as hydraulic motors.

Hence, a direct possibility for transmission of mechanical energy from the drive unit 10 both to the first and to the fourth hydraulic displacement machine exists in the hydraulic drive system of the invention. Furthermore, there exists a direct possibility for transmission of mechanical energy from the second and third hydraulic displacement machines to the winch 6 and conversely from the winch 6 to the second and third hydraulic displacement machines.

The winch 6 now can first be driven via the closed hydraulic circuit comprising first and second displacement machines, wherein the mechanical energy provided by the drive unit 10 is converted into hydraulic energy by the first hydraulic displacement machine and again is converted into mechanical energy by the second hydraulic displacement machine, which drives the winch 6. On the other hand, when mechanical energy is transmitted from the winch 6 back to the hydraulic drive system, as is the case when lowering the load, the hydraulic energy now no longer must be destroyed as in existing systems or be supported on the drive unit 10, but drives the third hydraulic displacement machine 3, which now operates as pump and pumps hydraulic fluid from the reservoir 9 into the high-pressure accumulator 5. Due to the direct conversion of mechanical energy into hydraulic energy without any further interposed conversion, an excellent efficiency can be achieved, so that the energy obtained when lowering the load can be stored efficiently.

Conversely, when lifting a load via the winch 6, the winch can also be driven via the third hydraulic displacement machine 3, wherein hydraulic fluid flows from the high-pressure accumulator 5 to the hydraulic reservoir 9. As a result, the drive is supported by the hydraulic circuit comprising first and second hydraulic displacement machines, so that the drive unit 10 also can be dimensioned smaller. The efficiency obtained by the direct conversion of the hydraulic energy from the hydraulic accumulator into mechanical energy, which drives the winch 6, in turn is very high, so that an efficient recovery of energy can be effected in general.

In addition, the high-pressure accumulator 5 can also be charged via the fourth hydraulic displacement machine 4, when the energy provided by the drive unit 10 is not or not completely required for driving the first hydraulic displacement machine 1. In this way, it is in particular possible to operate the Diesel engine of the drive unit 10 at an optimum operating point, wherein in phases in which only little power is required for driving the winch 6, the high-pressure accumulator 5 is charged, and in phases in which a particularly high power is required, the energy is again released from the high-pressure accumulator 5 and also drives the winch via the third hydraulic displacement machine.

The volume flow through the closed hydraulic circuit comprising first and second hydraulic displacement machines determines the movement of the winch, whereas the third hydraulic displacement machine is driven by the winch 6 or drives the winch 6 depending on the load situation, and the fourth hydraulic displacement machine 4 charges or does not charge the high-pressure accumulator 5 depending on the operating situation. In this way, there can also be realized a primary control of the primary drive and a secondary control of the secondary drive comprising third and fourth hydraulic displacement machines and high-pressure accumulator.

In the embodiment, all hydraulic displacement machines are configured as adjustable displacement machines with two directions of delivery, wherein all hydraulic displacement machines can operate both as hydraulic pumps and as hydraulic motors. For the operation of the hydraulic drive system of the invention, however, such configuration of all hydraulic displacement machines is not absolutely necessary.

Usually, the first hydraulic displacement machine 1 operates as pump, and the second hydraulic displacement machine 2 operates as motor, wherein the adjustability provides for activating the winch. The fourth hydraulic displacement machine 4 usually operates as pump, in order to charge the hydraulic accumulator 5. Its adjustability serves to activate such charging. The third hydraulic displacement machine usually operates both as pump and as motor, and in this embodiment switching between these functions is possible by adjusting the direction of delivery. The adjustability of the third hydraulic displacement machine not only provides for switching between pump and motor operation, but also for controlling the storage and release of energy by the hydraulic accumulator 5. The hydraulic displacement machines 3 and 4 thus can be connected with the high-pressure accumulator 5 directly and without valve arrangement, since activation is effected via the adjustment of the displacement machines. Alternatively, however, an activation realized by means of valves would be conceivable.

The embodiment of the hydraulic drive system of the invention as shown in FIG. 2b largely corresponds with the hydraulic drive system shown in FIG. 2a, so that a further description of the corresponding components is omitted. The only difference to the first embodiment shown in FIG. 2a is the connection of the second and third hydraulic displacement machines with the winch 6, which in the fourth embodiment only is effected via the interposed transmission 17. Thus, while in the embodiment of FIG. 2a the second and third hydraulic displacement machines and the winch 6 are arranged in series on one axle, the second and third hydraulic displacement machines of the fourth embodiment are arranged in parallel and connected with a transmission 17, which in turn drives the winch 6.

Figure 2C:
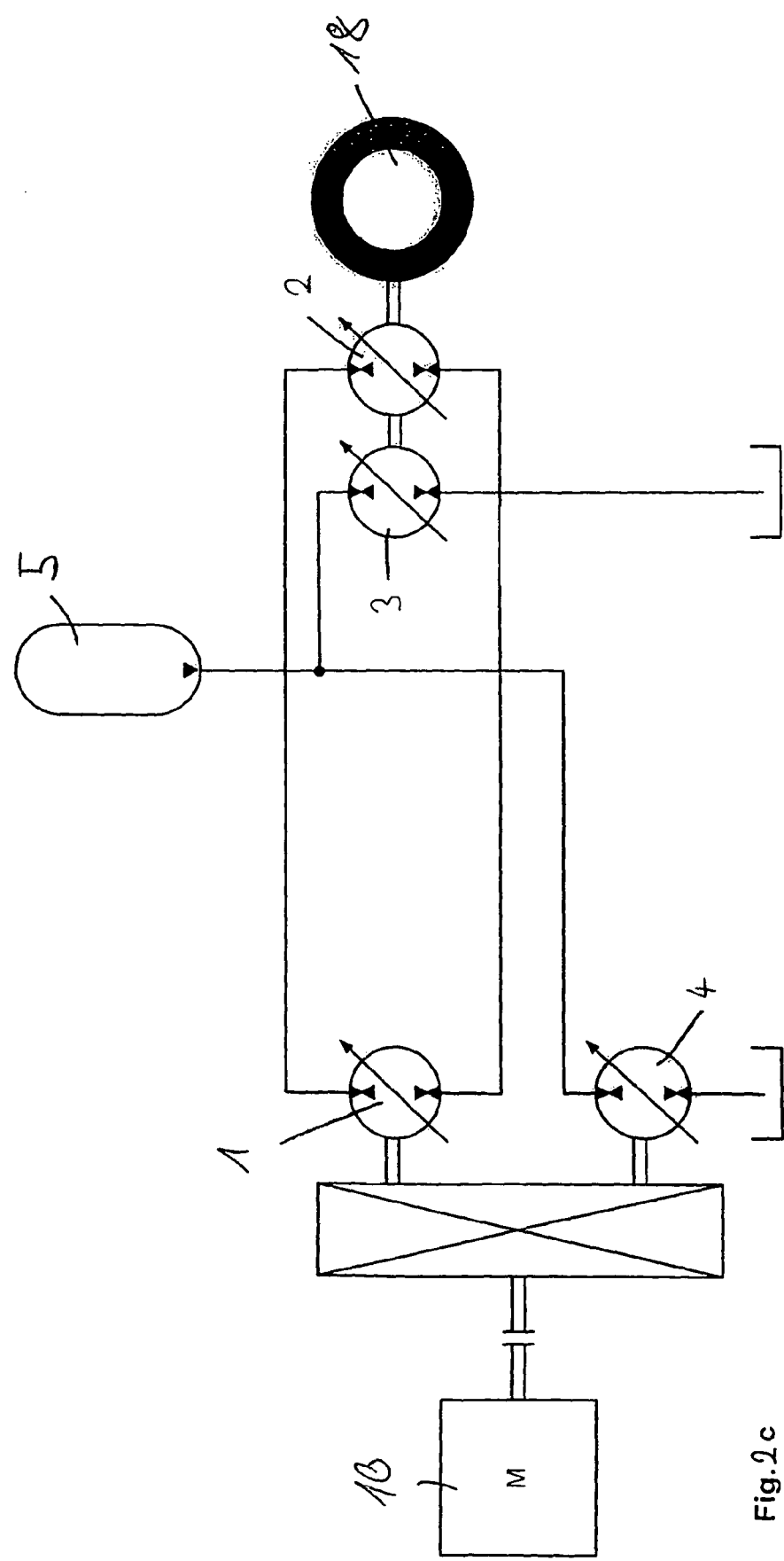
FIG. 2b: shows an alternative embodiment of the hydraulic drive system shown in FIG. 2a, FIG. 2c: shows the embodiment of the hydraulic drive system of the invention as shown in FIG. 2a for driving a traveling drive.
FIG. 2d: shows an embodiment of the hydraulic drive system of the invention for driving two loads, comprising two closed primary hydraulic circuits, wherein a fourth hydraulic displacement machine is provided, via which the high-pressure accumulator can be charged.
FIG. 2e: shows an embodiment of the hydraulic drive system of the invention, which beside the hydraulic drive system shown in FIG. 2d includes a further hydraulic circuit for driving a further load.

FIG. 2c now shows an embodiment of the hydraulic drive system of the invention, which in terms of the drive components corresponds with the embodiment shown in FIG. 2a, but is not used for driving a crane winch, but is used as traveling drive of a mobile equipment, in this case of a reach-stacker or wheel loader. The traveling drive initially is effected hydraulically via the closed hydraulic circuit comprising first and second hydraulic displacement machines 1 and 2, wherein energy released when braking the vehicle can be stored in the high-pressure accumulator 5 via the third hydraulic displacement machine 3 and can be released again during acceleration maneuvers, wherein the third hydraulic displacement machine 3 then operates as hydraulic motor and drives the vehicle together with the second hydraulic displacement machine. When only little power is required for the traveling drive, the high-pressure accumulator 5 can directly be charged by the drive unit 10 via the fourth hydraulic displacement machine 4, so that the drive unit 10 can always be operated at an optimum operating point. Due to the direct conversion of energy, great savings of energy and increases in performance are also obtained for the traveling drive.

Figure 2D:
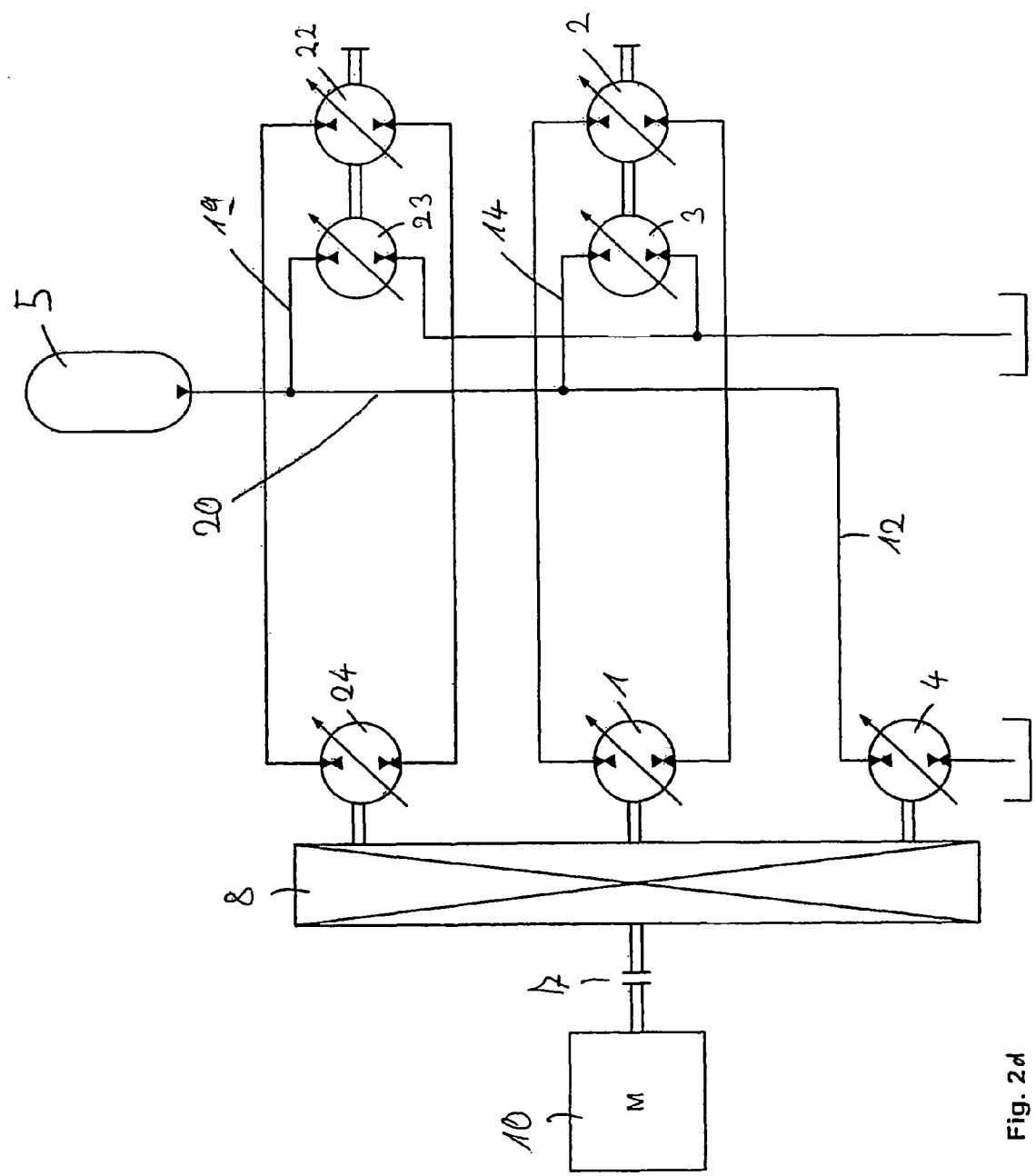

In the embodiment shown in FIG. 2d, two apparatuses now are provided, which can be driven separately via the hydraulic drive system. In a crane, both the hoisting winch and the slewing gear or two winches thus could for instance be driven via the hydraulic drive system. Via a clutch 7 and a transmission 8, the drive unit 10, again a Diesel engine, drives two first hydraulic displacement machines 1 and 21 arranged in parallel and a fourth hydraulic displacement machine 4. Like in the preceding embodiments, the first hydraulic displacement machine 1 forms a closed hydraulic circuit with a second hydraulic displacement machine 2, in order to drive the first apparatus. The further first hydraulic displacement machine 21 then likewise forms a closed hydraulic circuit with a further second hydraulic displacement machine 22, in order to drive the second apparatus. With the second hydraulic displacement machines 2 and 22 third hydraulic displacement machines 3 and 23 each are connected, which hence are also connected or connectable with the respective apparatuses.

During the recovery of energy, it hence is possible to directly convert the mechanical energy introduced via the respective apparatus into hydraulic energy via the hydraulic displacement machines 3 and 23, which hydraulic energy then is stored in a common high-pressure accumulator 5. For this purpose, the two third hydraulic displacement machines 3 and 23 are connected with the high-pressure accumulator 5 via hydraulic lines 14 and 19, respectively. Both apparatuses can also directly be driven via the respective third hydraulic displacement machines with the pressure from the high-pressure accumulator 5. For directly charging the high-pressure accumulator 5 via the drive unit 10, the fourth hydraulic displacement machine 4 furthermore is also connected with the high-pressure accumulator 5 via a hydraulic line 12. However, if no or only little load is applied to the drive unit 10 by the two loads, it can charge the hydraulic accumulator 5 via the fourth hydraulic displacement machine, so that the drive unit 10 again can be operated at an optimum operating point.

Hence, the energy management of the invention can also be used with optimum efficiencies for driving two loads, without having to completely double the drive system. For the additional load, merely one further third hydraulic displacement machine 23 is necessary as an additional element beside the anyway necessary drive comprising first and second hydraulic displacement machines 21 and 22, whereas the fourth hydraulic displacement machine 4 and the high-pressure accumulator 5 need not be doubled. On the contrary, the common high-pressure accumulator 5 provides for a simple transfer of energy between the two drive systems for the first and second apparatuses.

Figure 2E:
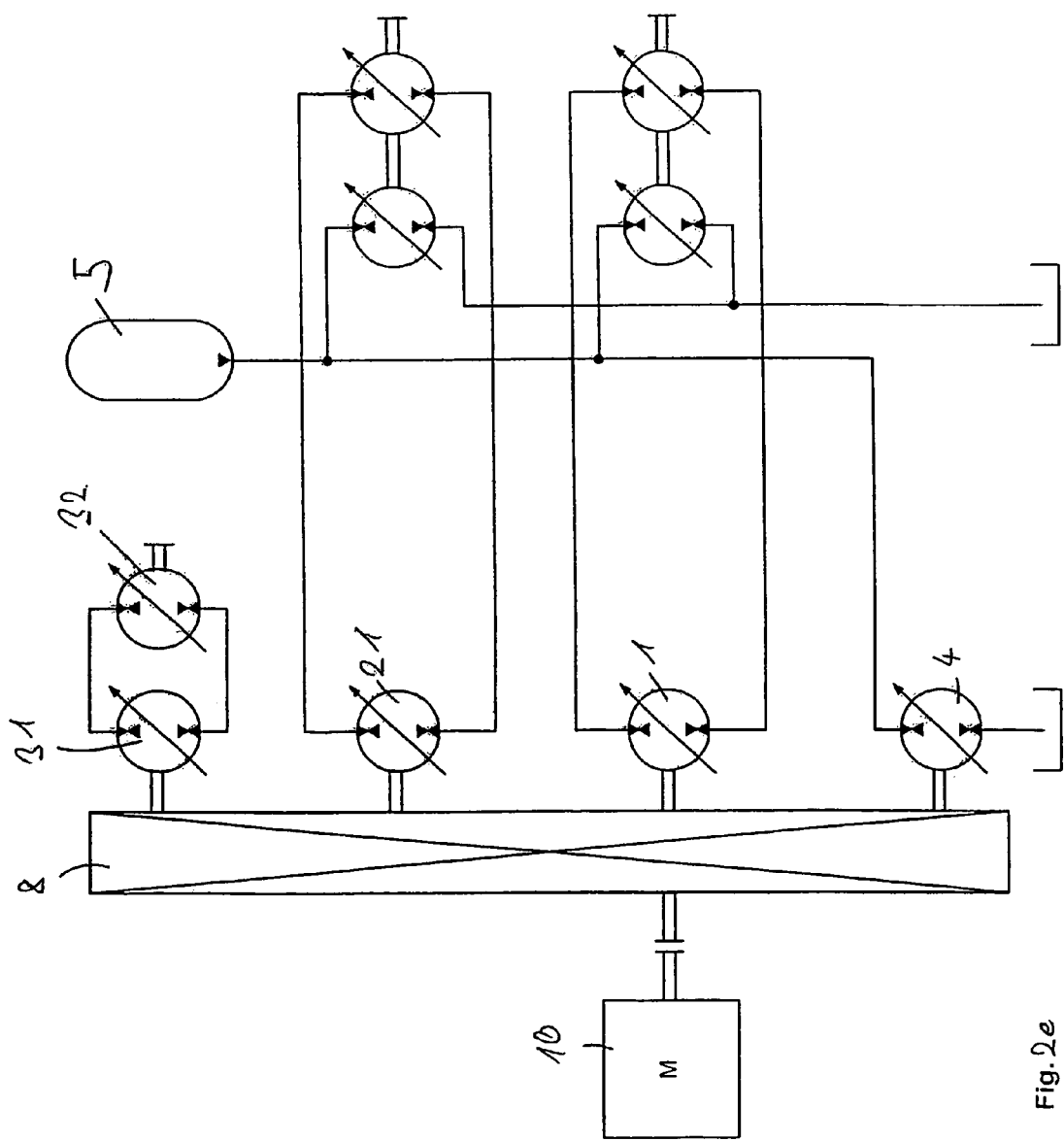

The embodiment shown in FIG. 2e is a drive system for three apparatuses, wherein the drive system for the first two apparatuses is identical with the embodiment shown in FIG. 2d, so that the description of these system components will be omitted. Beside the first hydraulic displacement machines 1 and 21 of the first two apparatuses and the fourth hydraulic displacement machine 4, the transmission 8, which is driven by the drive unit 10, now also drives the first hydraulic displacement machine 31 of the third apparatus, which is arranged parallel thereto. The first hydraulic displacement machine 31 of the third apparatus forms a hydraulic circuit with the further hydraulic displacement machine 32, which drives the third apparatus. Again, this is a closed circuit. On the third apparatus, no further displacement machine now is provided, so that during a braking operation of the third apparatus the high-pressure accumulator 5 can not directly be charged. During a braking operation of the third apparatus, it is, however, possible to initially convert the mechanical energy from the third apparatus into hydraulic energy via the hydraulic displacement machine, to again convert this hydraulic energy into mechanical energy via the hydraulic displacement machine 31, and to then provide this mechanical energy to the other hydraulic displacement machines via the transmission 8, so that the energy can again be converted into hydraulic energy e.g. via the fourth hydraulic displacement machine 4 and can be stored in the high-pressure accumulator 5. However, this results in a considerably worse efficiency than in the first and second apparatuses, in which a direct conversion of the mechanical energy into hydraulic energy is possible by the third hydraulic displacement machines.

Figure 3A:
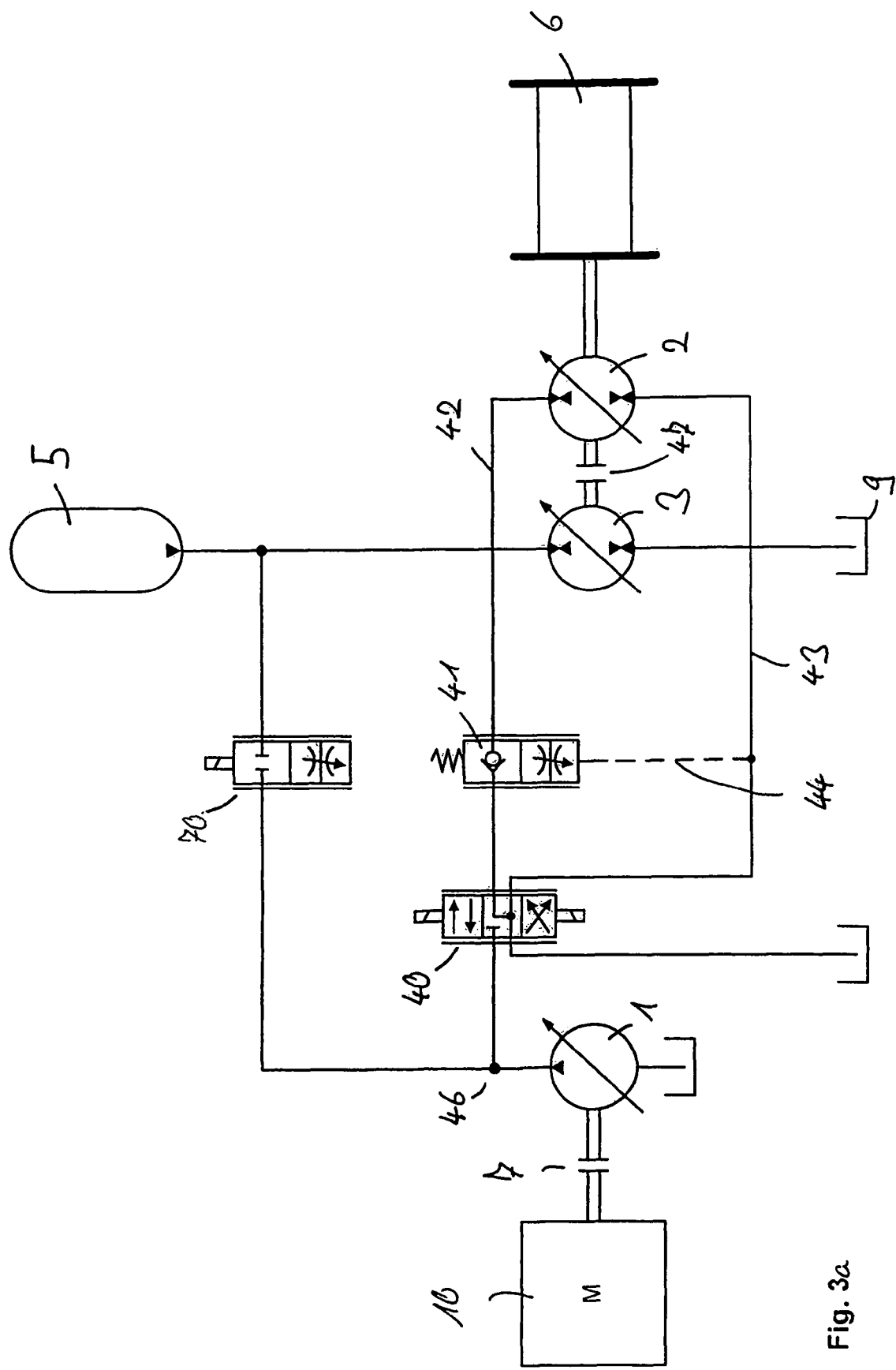
FIG. 3a: shows an embodiment of the hydraulic drive system of the invention for driving a winch with an open primary hydraulic circuit, wherein the high-pressure accumulator can be charged via the first hydraulic displacement machine of the primary hydraulic circuit.

FIG. 3a shows a further embodiment of the hydraulic drive system of the invention for driving a winch 6, wherein an open primary hydraulic circuit is used. The first hydraulic displacement machine 1 is driven via the drive unit 10, with which it is connectable via the clutch 7, and provides the pressure for the entire hydraulic system. The first hydraulic displacement machine 1 is a hydraulic pump with one direction of delivery and an adjustable volume flow. Via a 4/3-way valve 40, the outlet 46 of the first hydraulic displacement machine 1 is selectively connectable with the ports 42 and 43 of the second hydraulic displacement machine 2, which drives the winch 6. The respective port of the hydraulic displacement machine 2 which is not connected with the outlet 46 of the first hydraulic displacement machine 1 then is each connected with the hydraulic reservoir 9. Furthermore, the valve 40 also has a middle position, in which both outlets 42 and 43 are connected with the hydraulic reservoir 9. Furthermore, a valve 41 activated via a control line 44, which is connected with the low-pressure side 43, is provided in the connecting line 42 of the second hydraulic displacement machine 2 provided on the high-pressure side for winch operation. When the hydraulic line 43 is not pressurized, the valve 41 is a one-way valve, which prevents the back-flow of hydraulic fluid from the second to the first hydraulic displacement machine. In the reverse case, the valve 41 is an adjustable throttle.

Furthermore, a third hydraulic displacement machine 3 for transmitting mechanical energy in accordance with the invention is connectable with the winch 6 via a clutch 47 and is hydraulically connected with the high-pressure accumulator 5, so that mechanical energy released by the winch 6 can be converted into hydraulic energy via the third hydraulic displacement machine 3 and can be stored in the high-pressure accumulator 5. Conversely, the hydraulic energy stored in the high-pressure accumulator 5 can be used for driving the winch 6 via the third hydraulic displacement machine and hence be used to support the drive unit 10.

Via a valve 70, the high-pressure accumulator 5 now is connected with the outlet side 46 of the first hydraulic displacement machine 1. This arrangement substantially allows an operation like in the embodiment of the present invention shown in FIG. 1a, and when charging the high-pressure accumulator 5, the first hydraulic displacement machine 1 receives the necessary hydraulic fluid directly from the reservoir 9, since it is an open hydraulic circuit.

Figure 3B:
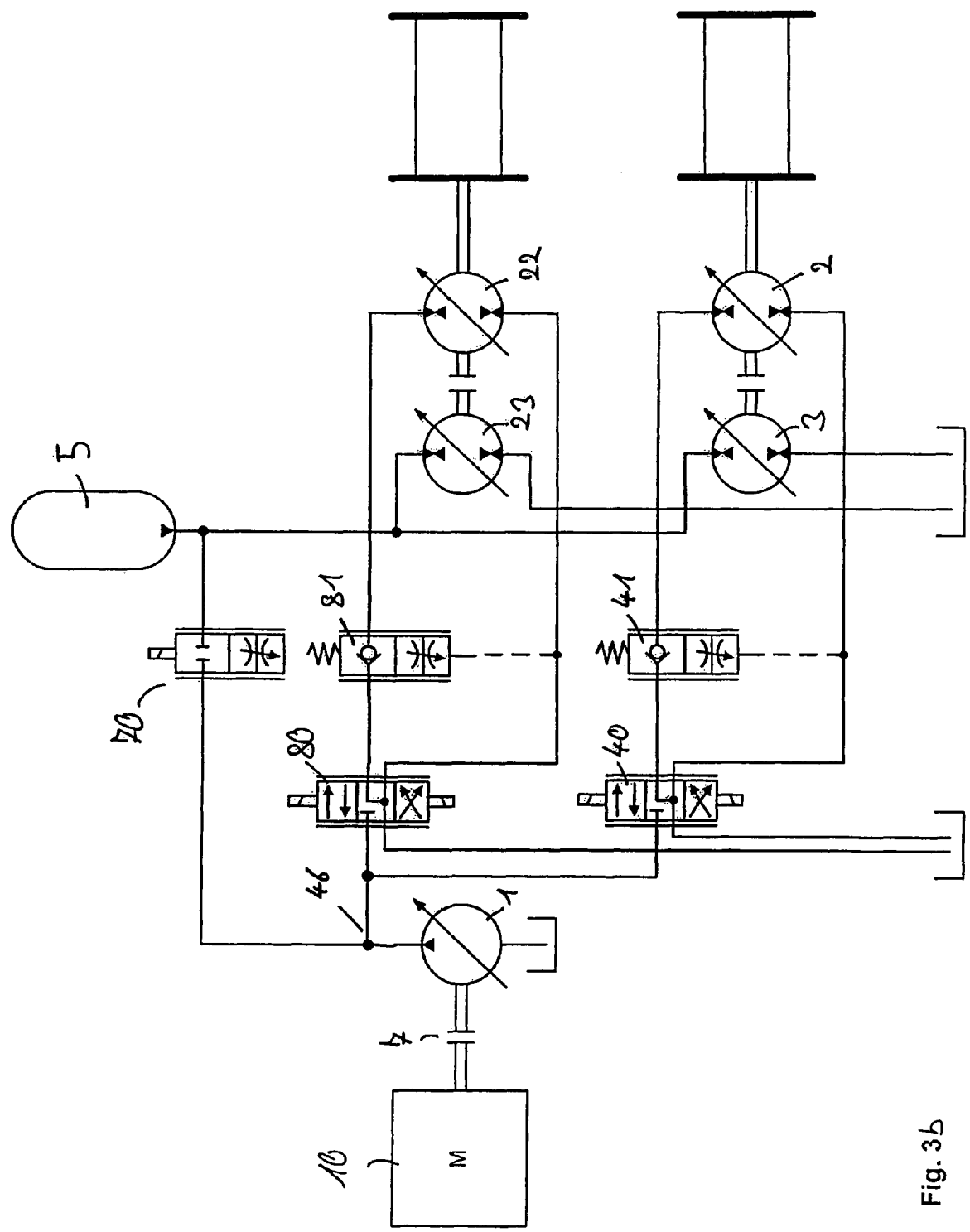
FIG. 3b: shows an embodiment of the hydraulic drive system of the invention for driving two winches, comprising two open primary hydraulic circuits, which are supplied with hydraulic fluid by a single first hydraulic displacement machine, wherein the high-pressure accumulator can be charged via the first hydraulic displacement machine.

FIG. 3b now shows a further embodiment of the present invention, in which the arrangement used in FIG. 3a is employed for driving two winches. For this purpose, two second hydraulic displacement machines 2 and 22 are provided, which each drive the first and the second winch, respectively, and are driven by the first hydraulic displacement machine 1 via valves 40 and 41 as well as 80 and 81, like in the embodiment shown in FIG. 3a. Furthermore, third hydraulic displacement machines 3 and 23 each are provided, which are each connectable with the first and the second winch via clutches and with one side each are hydraulically connected with the hydraulic reservoir and with the other side with the high-pressure accumulator 5. Like in the embodiment shown in FIG. 3a, the high-pressure accumulator 5 furthermore is connected with the outlet 46 of the first hydraulic displacement machine 1 via a valve 70.

Hence, the high-pressure accumulator 5 can be charged with the energy released by the winches via each of the third hydraulic displacement machines 3 and 23. The energy stored in the high-pressure accumulator 5 likewise can be used for driving the winches.

In operating phases in which the drive energy provided by the drive unit 10 is not or not completely required by the two hydraulic displacement machines 2 and 22 for driving the winches, it is furthermore possible to store the remaining energy in the hydraulic accumulator 5. This also results in the advantages described above with respect to the closed primary hydraulic circuits, which likewise are obtained in the now illustrated open primary hydraulic circuits.

Figure 4:
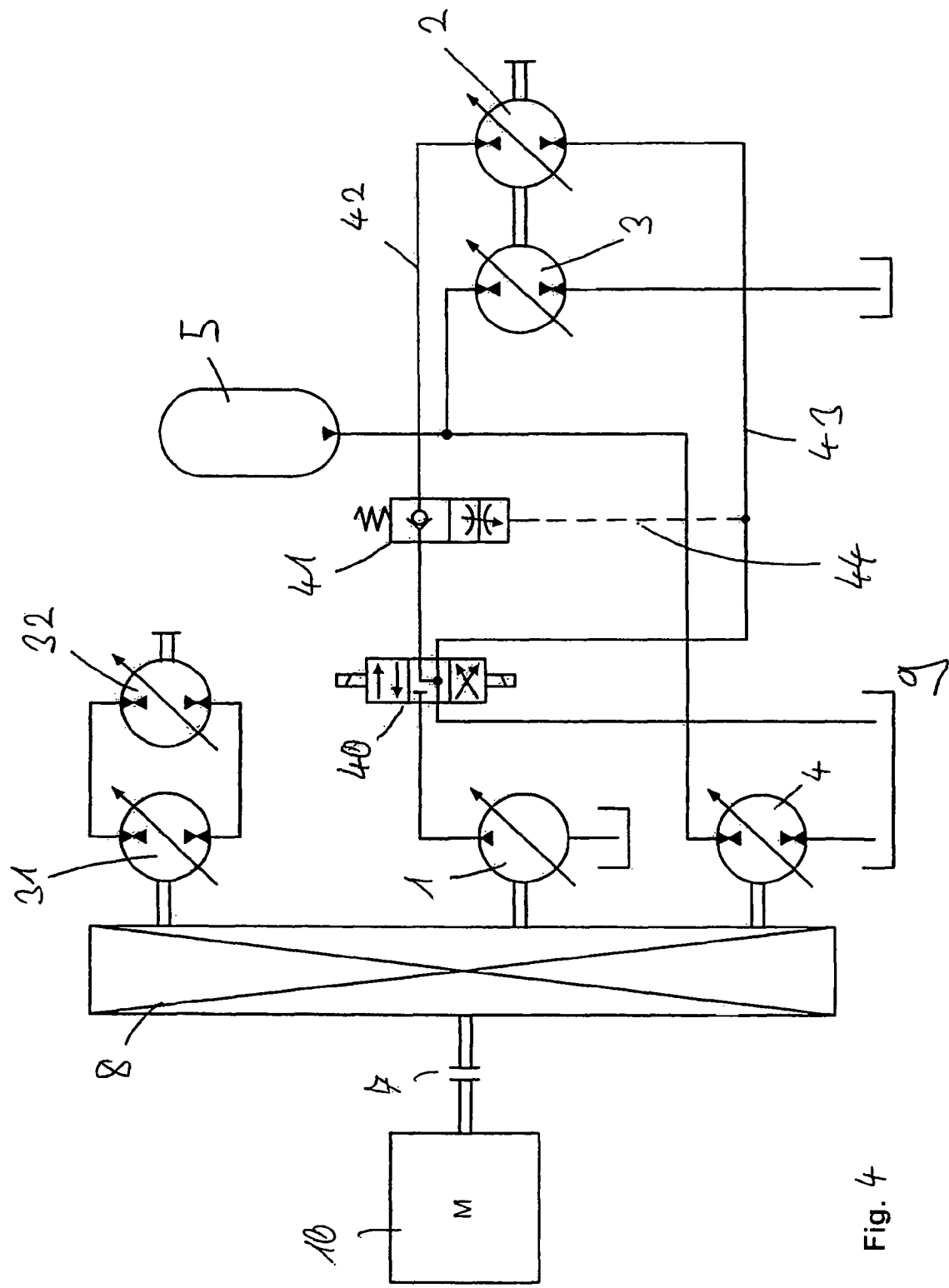
FIG. 4: shows an embodiment of the hydraulic drive system of the invention for driving a first apparatus, comprising an open primary hydraulic circuit and a fourth hydraulic displacement machine via which the high-pressure accumulator can be charged, wherein a further hydraulic circuit is provided for driving a further load.

FIG. 4 shows a further embodiment of a hydraulic drive system of the invention with an open primary hydraulic circuit, in which the high-pressure accumulator 5 can, however, be charged via a fourth hydraulic displacement machine. Hence, the primary hydraulic circuit corresponds to the embodiment shown in FIG. 3a, whereas the storage corresponds to the embodiment shown in FIG. 2a.

The first hydraulic displacement machine 1 is a variable-displacement pump, which is connectable with the respective inlet side of the second hydraulic displacement machine 2 via valves 40 and 41, whereas the respective outlet side is connectable with the hydraulic reservoir 9 via the valve 40. The valve 40 is a 4/3-way valve, which in a middle position connects the two ports of the second hydraulic displacement machine with the hydraulic reservoir and in the two outer switching positions connects the pressure-side outlet of the hydraulic pump 1 with one of the two ports of the second hydraulic displacement machine 2 either via the hydraulic line 42 or via the hydraulic line 43 and connects the respective other port of the second hydraulic displacement machine with the hydraulic reservoir 9, so that the hydraulic fluid pumped off from the hydraulic reservoir 9 by the hydraulic pump 1 each flows in different directions through the second hydraulic displacement machine 2. Furthermore, the valve activated via the control line 44 is provided in the hydraulic line 42, which represents a one-way valve when the hydraulic line 43 is not pressurized, and in the reverse case an adjustable throttle. This arrangement is provided in particular for driving a winch.

The arrangement of the fourth hydraulic displacement machine, of the third hydraulic displacement machine and of the hydraulic accumulator 5 in turn is identical with the embodiments shown in FIGS. 2a to 2e, so that the same will not be discussed again in detail. The operation with the corresponding accumulator management neither differs from the preceding embodiments.

Furthermore, a further load is provided in FIG. 4, which is driven via a separate hydraulic circuit without a separate storage of energy.

Figure 5A:
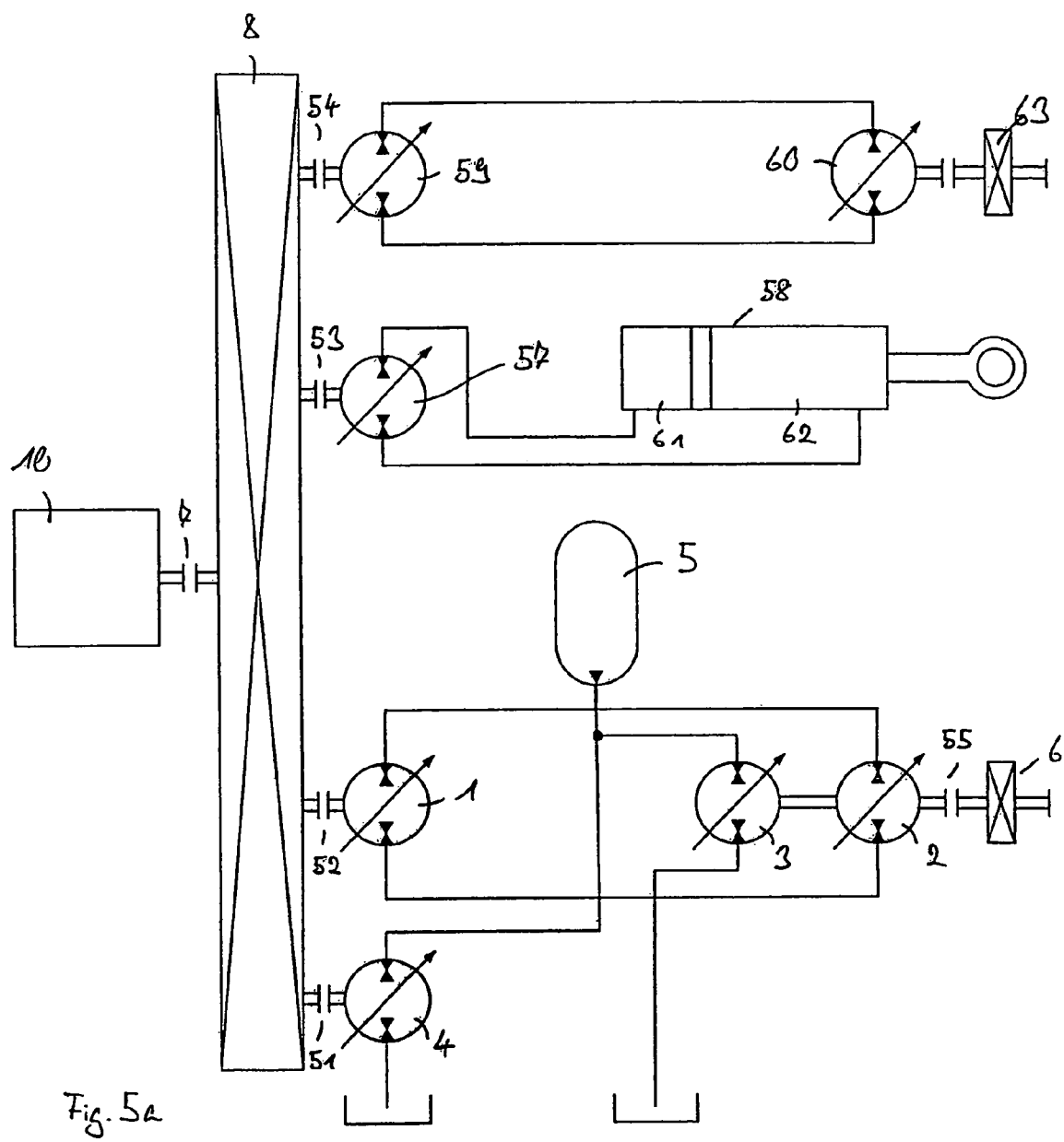
FIG. 5a: shows an embodiment of the hydraulic drive system of the invention for driving a crane, comprising a hydraulic drive system of the invention with energy recovery for driving the winch and two further hydraulic circuits for driving slewing gear and luffing gear.

FIG. 5a shows a hydraulic drive system of a crane, in which the direct recovery of energy in accordance with the invention is used for the hoisting gear, whereas luffing gear and stewing gear are driven in parallel via separate hydraulic circuits without a separate recovery of energy. The drive system of the hoisting gear 6 substantially corresponds to the embodiment shown in FIG. 2a, wherein clutches 52 and 51 now are additionally provided between the transmission 8 and the first and fourth hydraulic displacement machine, respectively. Furthermore, a further clutch 55 is provided between the second and third hydraulic displacement machines mounted on a common axle and the hoisting gear 6. Activation and accumulator management, however, substantially are effected like in the first embodiment. The clutches neither are absolutely necessary, so that the same might also be omitted in alternative embodiments.

Furthermore, the luffing gear 58 and the slewing gear 63 now are provided as further apparatuses, which are driven via the hydraulic system. Via the clutch 53, the transmission 8 is connectable with a variable-displacement pump 57, which drives the hydraulic cylinder of the luffing gear 58. For this purpose, the pressure chambers 61 and 62 of the hydraulic cylinder each are connected with the ports of the hydraulic pump 57, which is adjustable and has two directions of delivery, in order to correspondingly move the luffing gear in both directions.

Via the clutch 54, the transmission 8 furthermore is connectable with a hydraulic pump 59, which forms a closed hydraulic circuit with a hydraulic motor 60, which drives the slewing gear 63 via a clutch 56. The hydraulic pump 59 is configured as a variable-displacement pump with two directions of delivery, the hydraulic motor 60 as a constant-displacement motor with two directions of delivery.

Neither the clutches between transmission and hydraulic displacement machines nor the clutches between hydraulic displacement machines and the apparatuses are absolutely necessary, so that in alternative embodiments some or all of the clutches might be omitted.

As explained already with reference to FIG. 2e, the recovery of energy from the movement of luffing gear and slewing gear cannot be effected directly, as is the case with the hoisting gear, but only indirectly via the transmission 8, so that the efficiencies are correspondingly worse in this case. But since the central cyclic activity in a crane is the actuation of the hoisting gear including lifting and lowering the load, the direct recovery of energy by the present invention is of major importance for the hoisting gear.

Figure 5B:
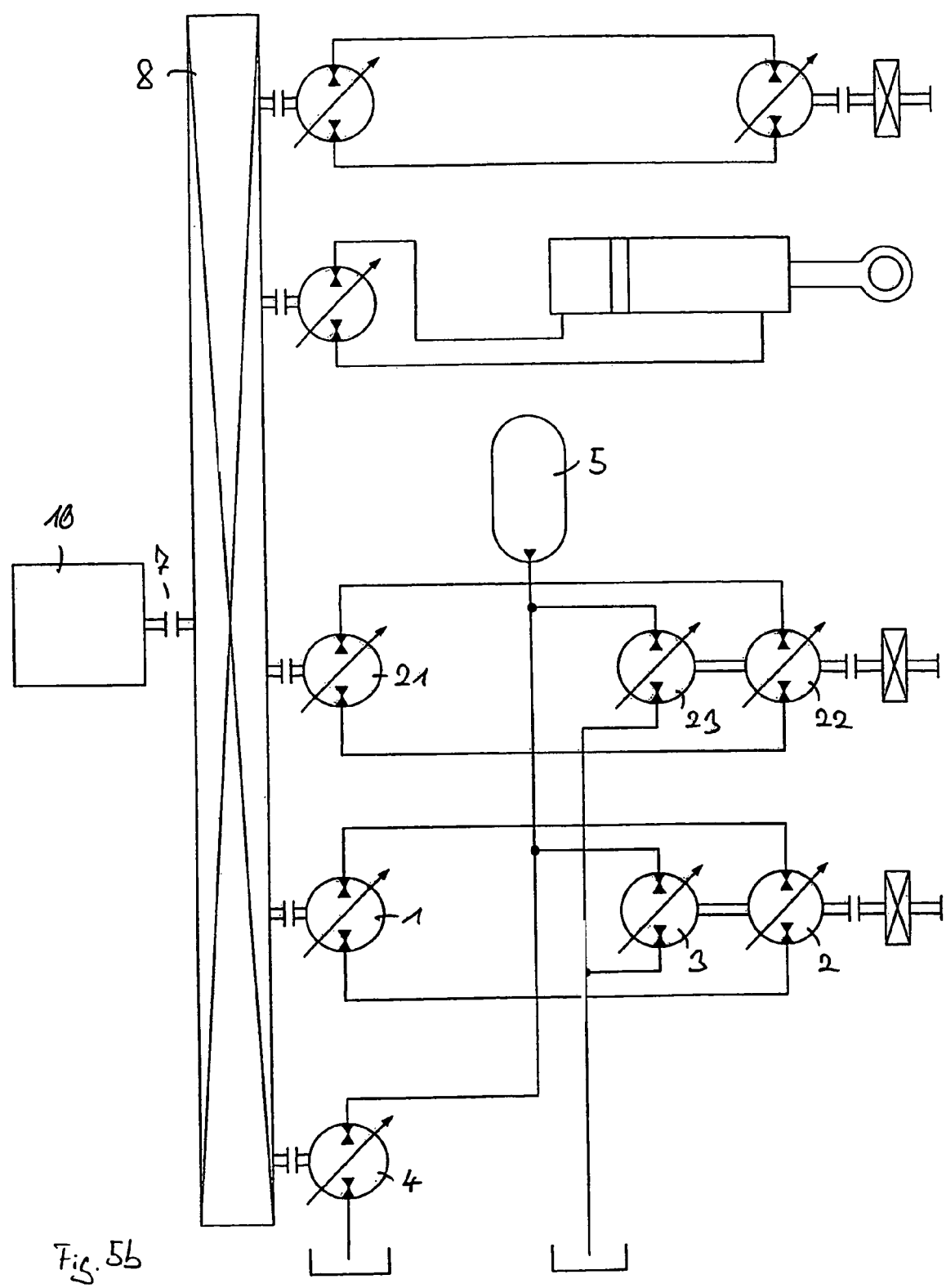
FIG. 5b: shows an embodiment of the hydraulic drive system of the invention for driving a crane, comprising a hydraulic drive system of the invention with energy recovery for driving two winches and two further hydraulic circuits for driving the luffing gear and the slewing gear.

FIG. 5b shows a further embodiment of the hydraulic drive system of the invention for driving a crane, which corresponds to the embodiment shown in FIG. 5a with respect to the luffing and slewing gear and now incorporates two winches in the storage of hydraulic energy in accordance with the invention. The hydraulic drive system for driving the two winches corresponds to the drive system shown in FIG. 2d, i.e. it each includes a closed primary hydraulic circuit comprising first hydraulic displacement machines 1, 21 and second hydraulic displacement machines 2, 22, whereas the storage of energy is effected via third hydraulic displacement machines 3, 23 and via a fourth hydraulic displacement machine 4, which is connectable with the drive unit 10 via a clutch.

The operation of the drive system shown in FIG. 5b substantially is effected like that of the drive system shown in FIG. 5a, wherein a recovery of energy now is possible from the movement of two winches, and a support of the drive via the hydraulic energy stored in the high-pressure accumulator 5 likewise is possible for both winches.

As described already, substantial savings of energy in cargo handling operations are obtained in accordance with the invention for the crane drives shown in FIGS. 5a and 5b due to the direct recovery of energy from the hoisting gear via the third hydraulic displacement machine 3 and the utilization of the high-pressure accumulator 5 and the third hydraulic displacement machine 3 as secondary drive source for an increase in performance, without having to increase the primary driving power of the drive unit 10 for this purpose. Furthermore, cooler surfaces can be reduced, since the energy released from the hoisting gear to the crane can be stored and no longer must be destroyed.

Due to the direct energy storage of the energy released by the drive unit 10 via the fourth hydraulic displacement machine 4, it is furthermore possible to operate the Diesel engine of the drive unit 10 at an optimum operating point, since energy not required can be stored efficiently. Due to the correspondingly reduced speed of the engine, both noise and exhaust emissions are reduced. In addition, the service life of the Diesel engine is increased.

In the case of load peaks, it is likewise possible to use the high-pressure accumulator 5 as secondary drive source for driving the luffing or slewing gear, in that the fourth hydraulic displacement machine operates as hydraulic motor and supplies mechanical energy via the transmission 8 to the other loads. Via the transmission 8, the recovery of energy from the luffing and slewing gear likewise is possible. However, not the same high efficiency is obtained here, which due to the direct conversion in accordance with the invention is possible for the hoisting gear.

Of course, the same advantages which were described with respect to a winch drive with a closed primary hydraulic circuit and a fourth hydraulic displacement machine, via which the high-pressure accumulator 5 can be charged, likewise can be achieved when one of the above-described alternative embodiments is chosen for the winch drive. Thus, an open primary hydraulic circuit likewise can be chosen, and as an alternative to the fourth hydraulic displacement machine, the high-pressure accumulator 5 likewise can be chargeable via the first hydraulic displacement machine.

It is merely decisive that the high-pressure accumulator 5 is chargeable via a hydraulic displacement machine, which is connected or connectable with the drive unit 10 for transmitting mechanical energy, so that energy which is not required for driving the winch can be stored efficiently, in particular also when the winch itself is at rest.

Figure 6A:
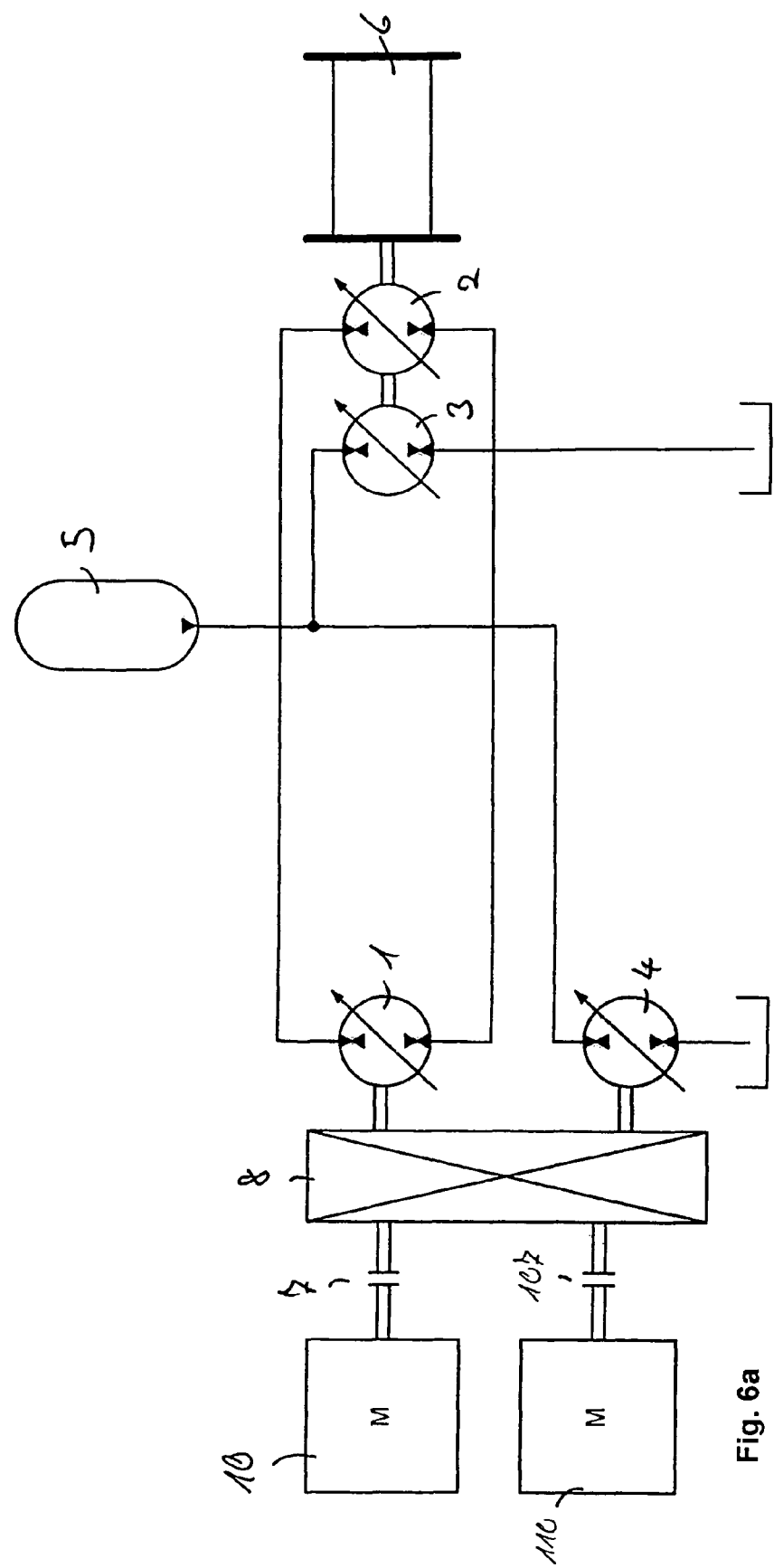
FIG. 6a: shows a further embodiment of a hydraulic drive system of the invention for driving a winch, wherein the drive unit includes to motors connected in parallel.

FIG. 6a now shows a further embodiment of the hydraulic drive system of the invention, which substantially corresponds to the drive system shown in FIG. 2a. However, two drive motors 10 and 110 are provided here, which are connected with the transmission 8 via clutches 7, 107, which in turn drives the first and fourth hydraulic displacement machines. Especially in electric drive motors, such arrangement can be advantageous, in order to provide the required performance. Due to the fact that the two motors 10 and 110 operate in parallel, the mechanical energy released by the same can be used both for driving the winch 6 and for storing energy. Thus, the advantages of the invention are obtained independent of whether the drive unit includes one or more motors operating in parallel.

Figure 6B:
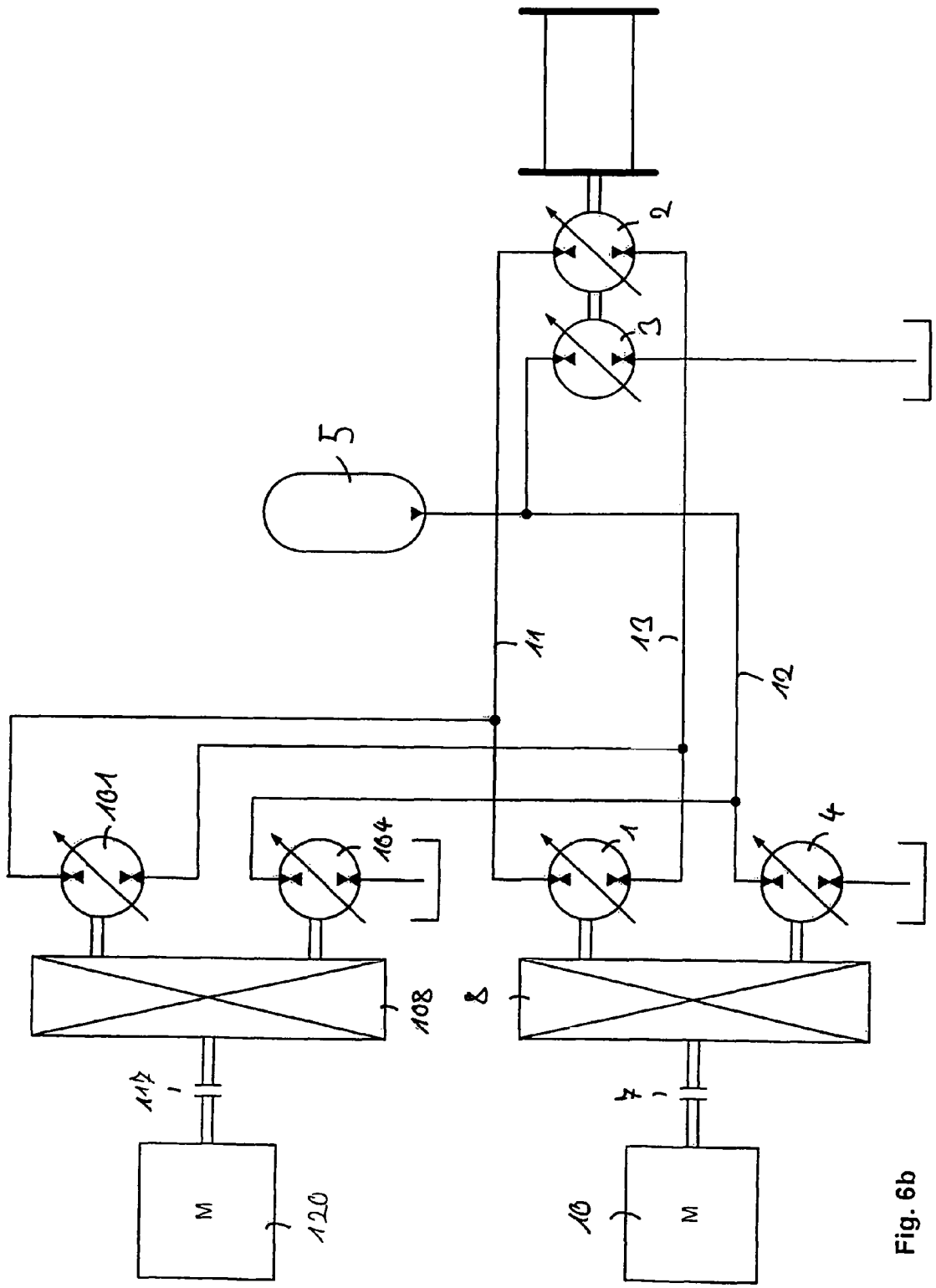
FIG. 6b: shows a further embodiment of the hydraulic drive system of the invention for driving a winch, wherein the drive unit and the first and fourth hydraulic displacement units are configured double.

In the embodiment of a hydraulic drive system of the invention as shown in FIG. 6b, a first partial system initially is provided, which corresponds to the system shown in FIG. 2a. Parallel thereto, a second partial system is provided, in which via a clutch 117 and a transmission 108 a further drive unit 120 drives a further first hydraulic displacement machine 101 and a further fourth hydraulic displacement machine 104, which hydraulically are connected in parallel to the first and fourth hydraulic displacement machines of the first partial system. This results both in a doubling of the performance of the entire system and in a redundant design, which increases the safety of the entire system. The operation of this system is effected analogous to the embodiment shown in FIG. 2a, wherein merely the drive side comprising drive unit and first and fourth hydraulic displacement machines was doubled, whereas the second and third hydraulic displacement machines provided for driving the winch are provided once.

With this drive system, the same advantages are obtained as already described above, wherein a redundancy with respect to the hydraulic pressure supply has been achieved in addition.

The invention claimed is:

1. A hydraulic drive system for driving an apparatus (6), with a drive unit (10) which can drive the apparatus (6) via a primary hydraulic circuit comprising a first hydraulic displacement machine (1) and a second hydraulic displacement machine (2), and with a third hydraulic displacement machine (3) which is connectable or connected with the apparatus (6) for transmitting mechanical energy, and a high-pressure accumulator (5) which is hydraulically connected or connectable with the third displacement machine (3), wherein
the high-pressure accumulator (5) can be charged by a hydraulic displacement machine which is connected or connectable with the drive unit (10) for transmitting mechanical energy, and
the third hydraulic displacement machine (3) is connected or connectable to provide recovery of energy or support of the drive system independently from the primary hydraulic circuit.

2. The hydraulic drive system according to claim 1, wherein the high-pressure accumulator (5) can be charged by the first hydraulic displacement machine (1).

3. The hydraulic drive system according to claim 1, wherein the high-pressure accumulator (5) can be charged via the third hydraulic displacement machine (3), the machine (3) operating as a hydraulic pump.

4. The hydraulic drive system according to claim 1, wherein the hydraulic displacement machine used for charging is connected or connectable with a hydraulic reservoir (9).

5. The hydraulic drive system according to claim 1, wherein the third hydraulic displacement machine (3) operates as hydraulic motor and can be driven via the high-pressure accumulator (5).

6. The hydraulic drive system according to claim 1, wherein shafts of the second hydraulic displacement machine (2) and of the third hydraulic displacement machine (3) are connectable or connected with a drive shaft of the apparatus (6) for transmitting mechanical energy.

7. The hydraulic drive system according to claim 6, wherein the shafts of the second and the third hydraulic displacement machine are connected directly or via a transmission (17).

8. The hydraulic drive system according to claim 1, wherein the output shaft of the drive unit (10) is connectable or connected with drive shafts of the first and/or a fourth hydraulic displacement machine for transmitting mechanical energy.

9. The hydraulic drive system according to claim 1, wherein at least one further apparatus (63) is driven via the drive unit (10).

10. The hydraulic drive system according to claim 1, wherein the drive unit (10) comprises an internal combustion engine or an electric motor.

11. The hydraulic drive system according to claim 10, wherein the drive unit comprises a single motor or a plurality of motors (10, 110) driving a transmission in parallel.

12. The hydraulic drive system according to claim 1, wherein the first and/or the second hydraulic displacement machine has two directions of delivery.

13. The hydraulic drive system according to claim 1, wherein the third and/or a fourth hydraulic displacement machine has two directions of delivery.

14. The hydraulic drive system according to claim 1, comprising a control for activating the storage and work functions of the system.

15. The hydraulic drive system according to claim 1 for driving a crane.

16. The hydraulic drive system according to claim 1 for driving a mobile equipment, in particular a reachstacker or a wheel loader.

17. The hydraulic drive system according to claim 16, wherein the apparatus (6) is a traveling drive.

18. A crane with a hydraulic drive system according to claim 1.

19. A mobile equipment, in particular a reachstacker or wheel loader, with a hydraulic drive system according to claim 1.

20. A method for operating a drive system according to claim 1, wherein the high-pressure accumulator (5) is charged by conversion of the kinetic energy of the apparatus (6) via the third hydraulic displacement machine (3) and/or the high-pressure accumulator (5) is charged via a hydraulic displacement machine which is connected or connectable with the drive unit (10) for transmitting mechanical energy, when the power of the drive unit (10) is not or not completely required for driving the apparatus (6), and the third hydraulic displacement machine (3) provides recovery of energy or support of the drive system independently from the primary hydraulic circuit.

21. The method according to claim 20, wherein charging the high-pressure accumulator (5) is effected while the apparatus (6) is not moved.

22. The method according to claim 20, wherein the apparatus (6) is driven by conversion of the hydraulic energy from the high-pressure accumulator (5) via the third hydraulic displacement machine (3).

23. A hydraulic drive system for driving an apparatus (6), with a drive unit (10) which can drive the apparatus (6) via a primary hydraulic circuit comprising a first hydraulic displacement machine (1) and a second hydraulic displacement machine (2), and with a third hydraulic displacement machine (3) which is connectable or connected with the apparatus (6) for transmitting mechanical energy, and a high-pressure accumulator (5) which is hydraulically connected or connectable with the third displacement machine (3), wherein the high-pressure accumulator (5) can be charged by a hydraulic displacement machine which is connected or connectable with the drive unit (10) for transmitting mechanical energy, and one of (i) a fourth hydraulic displacement machine (4) is provided, via which the high-pressure accumulator (5) can be charged, or (ii) the first and/or a fourth hydraulic displacement machine operates as hydraulic motor and can be driven via the high-pressure accumulator (5), or (iii) the first hydraulic displacement machine (1) also can operate as hydraulic motor and the second hydraulic displacement machine (2) also can operate as hydraulic pump, so that the second hydraulic displacement machine drives the first hydraulic displacement machine, or (iv) the first and the second hydraulic displacement machine form a closed hydraulic circuit, or (v) the first and/or the second hydraulic displacement machine has an adjustable displacement volume, or (vi) the third and/or a fourth hydraulic displacement machine has an adjustable displacement volume, or (vii) mechanical energy is supplied to further loads by conversion of the hydraulic energy from the high-pressure accumulator (5) via the first and/or a fourth hydraulic displacement machine.

24. A hydraulic drive system for driving an apparatus (6), with a drive unit (10) which can drive the apparatus (6) via a primary hydraulic circuit comprising a first hydraulic displacement machine (1) and a second hydraulic displacement machine (2), and with a third hydraulic displacement machine (3) which is connectable or connected with the apparatus (6) for transmitting mechanical energy, and a high-pressure accumulator (5) which is hydraulically connected or connectable with the third displacement machine (3), wherein the high-pressure accumulator (5) can be charged by a hydraulic displacement machine which is connected or connectable with the drive unit (10) for transmitting mechanical energy, shafts of the second hydraulic displacement machine (2) and of the third hydraulic displacement machine (3) are connectable or connected with a drive shaft of the apparatus (6) for transmitting mechanical energy, and the shafts of the second and/or the third hydraulic displacement machine are connectable with the drive shaft of the apparatus (6) via at least one clutch (55).

25. A hydraulic drive system for driving an apparatus (6), with a drive unit (10) which can drive the apparatus (6) via a primary hydraulic circuit comprising a first hydraulic displacement machine (1) and a second hydraulic displacement machine (2), and with a third hydraulic displacement machine (3) which is connectable or connected with the apparatus (6) for transmitting mechanical energy, and a high-pressure accumulator (5) which is hydraulically connected or connectable with the third displacement machine (3), wherein the high-pressure accumulator (5) can be charged by a hydraulic displacement machine which is connected or connectable with the drive unit (10) for transmitting mechanical energy, the output shaft of the drive unit (10) is connectable or connected with drive shafts of the first and/or a fourth hydraulic displacement machine for transmitting mechanical energy, and either the drive shafts of the first and the fourth hydraulic displacement machine are independently connectable with the drive shaft of the drive unit via at least two clutches (51, 52), or (ii) the drive unit (10) drives the drive shafts of the first and/or the fourth hydraulic displacement machine via a transmission (8).

26. A hydraulic drive system for driving an apparatus (6), with a drive unit (10) which can drive the apparatus (6) via a primary hydraulic circuit comprising a first hydraulic displacement machine (1) and a second hydraulic displacement machine (2), and with a third hydraulic displacement machine (3) which is connectable or connected with the apparatus (6) for transmitting mechanical energy, and a high-pressure accumulator (5) which is hydraulically connected or connectable with the third displacement machine (3), wherein the high-pressure accumulator (5) can be charged by a hydraulic displacement machine which is connected or connectable with the drive unit (10) for transmitting mechanical energy, at least one further apparatus (63) is driven via the drive unit (10), and one of (i) the further apparatus (63) is driven via a hydraulic circuit with a hydraulic pump (59) and the hydraulic pump is driven by the drive unit (10), or (ii) the further apparatus (63) or the hydraulic pump (59) driving the further apparatus (63) is connectable with the drive unit (10) via at least one clutch (54) independent of the first and/or the fourth hydraulic displacement machine, or (iii) the further apparatus (63) or the hydraulic pump driving the further apparatus (63) is connectable with the first and/or a fourth hydraulic displacement machine for transmitting mechanical energy, in particular via at least one clutch.

27. A hydraulic drive system for driving an apparatus (6), with a drive unit (10) which can drive the apparatus (6) via a primary hydraulic circuit comprising a first hydraulic displacement machine (1) and a second hydraulic displacement machine (2), and with a third hydraulic displacement machine (3) which is connectable or connected with the apparatus (6) for transmitting mechanical energy, and a high-pressure accumulator (5) which is hydraulically connected or connectable with the third displacement machine (3), wherein the high-pressure accumulator (5) can be charged by a hydraulic displacement machine which is connected or connectable with the drive unit (10) for transmitting mechanical energy, two apparatuses are provided, whose drive systems each have first, second and third hydraulic displacement machines, the first hydraulic displacement machines (1, 21) are connectable or connected with the drive unit (10) for transmitting mechanical energy, the second hydraulic displacement machines (2, 22) and the third hydraulic displacement machines (3, 23) each are connectable or connected with the apparatuses for transmitting mechanical energy, the first hydraulic displacement machines (1, 21) each are hydraulically connected or connectable with the second hydraulic displacement machines (2, 22), and the high-pressure accumulator (5) is hydraulically connected or connectable with the third hydraulic displacement machines (3, 23).

28. The hydraulic drive system according to claim 27, wherein the high-pressure accumulator (5) can be charged by one or both of the two first hydraulic displacement machines (1, 21).

29. The hydraulic drive system according to claim 27, wherein a fourth hydraulic displacement machine (4) additionally is provided, via which the high-pressure accumulator (5) can be charged.

30. A hydraulic drive system for driving a crane through an apparatus (6), with a drive unit (10) which can drive the apparatus (6) via a primary hydraulic circuit comprising a first hydraulic displacement machine (1) and a second hydraulic displacement machine (2), and with a third hydraulic displacement machine (3) which is connectable or connected with the apparatus (6) for transmitting mechanical energy, and a high-pressure accumulator (5) which is hydraulically connected or connectable with the third displacement machine (3), wherein the high-pressure accumulator (5) can be charged by a hydraulic displacement machine which is connected or connectable with the drive unit (10) for transmitting mechanical energy, and the apparatus (6) is a winch, in particular a hoisting winch.

31. A hydraulic drive system for driving an apparatus (6), with a drive unit (10) which can drive the apparatus (6) via a primary hydraulic drive comprising hydraulic pump (1) and hydraulic motor (2), and with a secondary hydraulic drive which includes a further hydraulic displacement machine (3) which is connectable or connected with the apparatus (6) for transmitting mechanical energy, and a high-pressure accumulator (5) which is hydraulically connected or connectable with the further displacement machine (3), and with a control, wherein the primary hydraulic drive is under primary control that controls speed or position of the apparatus and the secondary hydraulic drive is under secondary control that controls torque.

32. A method for driving an apparatus (6) via a hydraulic drive system with a drive unit (10), which can drive the apparatus (6) via a primary hydraulic drive comprising hydraulic pump (1) and hydraulic motor (2), and with a secondary hydraulic drive which includes a further hydraulic displacement machine (3) which is connectable or connected with the apparatus (6) for transmitting mechanical energy, and a high-pressure accumulator (5) which is hydraulically connected or connectable with the further displacement machine, wherein the primary hydraulic drive is under primary control that controls speed or position of the apparatus and the secondary hydraulic drive is under secondary control that controls torque.

* * * * *